US012569080B2

(12) United States Patent
Shmith

(10) Patent No.: US 12,569,080 B2
(45) Date of Patent: Mar. 10, 2026

(54) ARTWORK HANDLING SYSTEM

(71) Applicant: Alto Art Systems Pty Ltd, Chewton (AU)

(72) Inventor: Michael Sam Athol Arthur George Shmith, Chewton (AU)

(73) Assignee: Alto Art Systems Pty Ltd, Chewton (AU)

( * ) Notice: Subject to any disclaimer, the term of this patent is extended or adjusted under 35 U.S.C. 154(b) by 94 days.

(21) Appl. No.: 18/129,338

(22) Filed: Mar. 31, 2023

(65) Prior Publication Data

US 2023/0233002 A1 Jul. 27, 2023

Related U.S. Application Data

(63) Continuation of application No. PCT/AU2021/051152, filed on Oct. 1, 2021.

(51) Int. Cl.
*A47G 1/16* (2006.01)
*B66C 1/66* (2006.01)

(52) U.S. Cl.
CPC .................. *A47G 1/16* (2013.01); *B66C 1/66* (2013.01); *A47G 2001/1693* (2013.01)

(58) Field of Classification Search
CPC ..... A47G 1/16; A47G 2001/1693; B66C 1/66
USPC ...................................... 248/475.1, 546, 547
See application file for complete search history.

(56) References Cited

U.S. PATENT DOCUMENTS 1,343,855 A 6/1920 Tyler
3,530,591 A * 9/1970 Moffitt .................. A47G 1/205 33/613
4,241,510 A * 12/1980 Radecki .................. G01B 3/02 33/474
4,455,756 A * 6/1984 Greene .................. A47G 1/205 33/613
4,572,470 A 2/1986 Siffert
4,637,583 A * 1/1987 Babitz .................. A47G 1/205 248/497
5,103,573 A * 4/1992 Ehling .................. G01C 9/34 33/379

(Continued)

FOREIGN PATENT DOCUMENTS

JP 2011218068 A 11/2011
WO WO-2018115810 A1 6/2018
WO WO-2022067396 A1 4/2022

OTHER PUBLICATIONS

International Preliminary Report on Patentability for International Application No. PCT/AU2021/051152 mailed Mar. 28, 2023, 5 pages.

(Continued)

*Primary Examiner* — Muhammad Ijaz

(74) *Attorney, Agent, or Firm* — COOLEY LLP

(57) ABSTRACT

An artwork handling system including: a bracket having a body being configured to be attached to an artwork, the body having an aperture extending at least partway therethrough; a handling tool, wherein one or more parts forming the aperture are adapted to: transfer weight of the artwork to the handling tool that is inserted into the aperture from a side of the artwork, the side extending transversely to a front surface displaying an artwork area; and assist in holding the artwork with the handling tool.

10 Claims, 32 Drawing Sheets

(56) References Cited

U.S. PATENT DOCUMENTS 5,109,611 A * 5/1992 Houck .................... B25H 7/04 33/666
5,112,022 A * 5/1992 Cardas .................... A47G 1/20 248/547
5,129,154 A * 7/1992 Aydelott ................ A47G 1/205 33/666
5,303,895 A 4/1994 Hart
5,398,906 A * 3/1995 Aydelott ................ A47G 1/205 248/477
5,509,213 A * 4/1996 Kelly ...................... G01B 3/02 33/474
5,520,318 A * 5/1996 Sloop ........................ B25C 1/02 227/32
6,026,584 A * 2/2000 Wegman ................ A47G 1/205 33/465
6,032,378 A * 3/2000 Null ....................... A47G 1/205 33/645
6,412,838 B1 7/2002 Malamud
6,971,184 B2 * 12/2005 Prevost .................. A47G 1/205 33/666
7,226,032 B2 * 6/2007 Schlais .................. A47G 1/205 33/645
7,566,042 B1 * 7/2009 Yates ..................... A47G 1/205 248/466
7,686,275 B2 * 3/2010 Scarcello ............... F16M 11/14 248/231.91
8,209,836 B2 * 7/2012 Klein ..................... F16M 13/02 29/283
8,272,619 B2 * 9/2012 Ernst ........................ A47G 1/20 248/475.1
10,047,903 B2 * 8/2018 Bruno .................... F16M 13/02
2008/0023615 A1 * 1/2008 Scarcello ................. A47G 1/24 248/480
2009/0283650 A1 * 11/2009 Yates ..................... A47G 1/205 248/220.21
2010/0019114 A1 * 1/2010 Vargo ....................... B44D 3/18 16/422
2019/0116995 A1 4/2019 Udermann

OTHER PUBLICATIONS

International Search Report and Written Opinion for International Application No. PCT/AU2021/051152 mailed Nov. 10, 2021, 8 pages.
EP Application No. 21873740.1, Extended European Search Report dated Sep. 19, 2024, 9 pages.

* cited by examiner

ARTWORK HANDLING SYSTEM

RELATED APPLICATION

This application is a continuation of International Patent Application No. PCT/AU2021/051152, filed on Oct. 1, 2021, which is based on and claims priority to Australian provisional patent application No 2020903555 filed on 1 Oct. 2020, the content of each of which is incorporated by reference in its entirety.

FIELD OF THE INVENTION

The invention relates to an artwork handling system. In particular, the invention relates, but is not limited, to a handling system for installing, displaying and shipping artworks. The invention also relates to a method for handling artworks.

BACKGROUND TO THE INVENTION

Reference to background art herein is not to be construed as an admission that such art constitutes common general knowledge in Australia or elsewhere.

Global sales of art across the world reached 67 billion US dollars in 2018. As part of protecting and shipping artworks, the commercial art market spends in excess of five billion US dollars per year. However, despite the significant value of some artworks, and the money spent protecting and shipping artworks, fine art logistics is still an antiquated industry. Artworks are still gripped by hand during packing, shipping and installation. This exposes the artworks to a high level of risk, as further outlined below. This level of risk is compounded by: i) the fragility of artworks which are often weaken by age; ii) the cultural and monetary value of some artworks/artefacts; and iii) most artworks being irreplaceable if damaged or destroyed.

Art handlers are normally directed by the custodians of the artwork to wear gloves during handling. Some artworks require powder-free nitrile (latex) gloves for safe handling, whilst others may require cotton gloves, a combination of both (ie, nitrile underneath cotton) or other microfiber gloves. Handlers may confuse which glove to wear and, for example, natural oils excreted by hands may permeate cotton gloves, transferring indelible marks (called 'accretions' by conservators) to the artwork surface. In other cases, handlers might use entirely unsafe gloves for handling artworks (eg, rubber coated work gloves etc.) or no gloves at all.

Another potential risk art handlers pose is wearing gloves that are not clean. Gloves may pick up foreign particles during use that may damage an artwork. For example, during installation or handling of an artwork, art handlers may wipe their brow or hair with their gloved hands, thereby picking up oils and particles which will be transferred to the artwork as they re-apply their grip.

The nature of particular artworks also makes installation difficult and prone to risk. For instance, unframed artworks (eg, paintings on canvas) typically require the sides of the artwork to be held as the reverse face is substantially in direct contact with the wall during installation and displaying. The sides of the artwork are considered part of the artwork, and often painted, meaning direct pressure is applied to the artwork which can easily mark or deform the artwork. Whilst handling the sides of the artwork, pressure may also be applied to the face of the art work, which is particularly sensitive to damage. It is also especially common to grip the base of an artwork during installation which, in the same manner to handling the side of an artwork, may result in pressing a palm, thumb or finger against the face of the artwork during movement and rotation of the artwork. Furthermore, gripping the rear face of an artwork is a leading cause of damage as, whilst gripping the support frame, fingers and knuckles may press against (for example) the canvas—causing cracks in the painted surface. Art handlers gripping the base of the artwork may also lean their torso and head toward the face of the artwork, exposing it to extreme danger of being pressed or knocked.

Separately, art handlers are not required to have accreditation (in the same way a conservator or preparator is). It is an unregulated industry, and the focus and skill required to safely handle these objects is not currently assessable, nor is their work always carefully supervised. This again compounds the issues surrounding the safe handling and installation of artworks.

Another problem with present handling practices is that during packing, installation or movement of an artwork, the artwork is often rested on foam blocks. Museums, galleries, art shippers and artist's studios may use unsafe materials to construct the blocks and they also store the blocks in uncontrolled environments, where they pick up dirt and other particles which are then transferred to the surface of the artwork. Art handlers also often 'kick' the blocks into place underneath artworks, transferring particles from their footwear onto the blocks and, in turn, onto the artwork.

Major museums will sometimes have a 'painting cart' (usually a steel, A-frame platform on wheels) where paintings may be placed during movement and installation. The surface of the base of the cart, where paintings rest, is often upholstered with standard (non archival) carpet. The carts may also pick up dirt and other particles which are then transferred to the artwork.

Shipping or transporting artworks also poses further challenges. For example, unframed artworks are usually shipped in wooden travel frames, typically housed within an additional (outer) wooden crate, each custom built to fit the dimensions of the artwork. When the artwork is a painting (eg, on canvas, stretched around a wooden frame), the reverse of the frame is often fitted with several travel attachments (for example Oz Clips®) such that they extend from the artwork to the travel frame, ensuring that the artwork is secured within the frame and that there is no contact with the face or sides of the artwork.

However, products currently available for handling and transporting artworks face certain shortfalls. For example, some designs rely on the limited strength capacity of a small 'pin' which connects the two brass components together. This is susceptible to failure even while securing moderate artwork loads (especially during 'topple events' whereby the crate falls 'face first' and the travel attachment is exposed to peak forces). Other 'perforated rail' products rely on a 'securing screw' to attach to the artwork mounted module, which features a threaded aperture to receive this fastener. This reduces the available thickness of the rail and artwork mounted module, thereby reducing its capacity for load bearing. This also increases the overall thickness of the attachment system, whereby it becomes a conspicuous attachment which distracts the viewer and further prevents the artwork from being installed flush to the wall. Similarly, whilst some clips can be rotated to hide behind the painting once installed, meaning theoretically that they do not need to be removed for the work to be installed, they are made from thick gauge brass and therefore leave a ¼" gap between the artwork and the wall, and are also clearly visible from the sides. As this creates an unappealing visual aspect in displaying artworks, artists or curators will often ensure that clips are removed before installation and then refitted when the work is removed and packed. Repeated removal and reattachment of clips can cause screw points to wear, and may cause clips to fail during transit.

If the unframed 2D artwork does not allow for such travel attachments to be installed, they are secured within the travel frame or crate by foam blocks, cut to fit the exact dimensions of the corners and sides of the artwork and, therefore, hold it in place within the travel frame during transit. As with foam blocks for resting the artwork, these are not always constructed out of the correct materials. The foam blocks also place pressure on the artworks and, as the travel frames are often exposed to impact during shipping, the foam blocks can create permanent marks along the artwork. These marks may also occur when the works are lifted from the travel frame, and inserted back into it, over an artworks' journey.

With the above in mind, the present inventor has developed an improved artwork handling system.

SUMMARY OF INVENTION

In one form, although not necessarily the only or broadest form, the invention resides in a bracket for an artwork handling system, the bracket including:

- a body being configured to be attached to an artwork, the body having an aperture extending at least partway therethrough,
- wherein one or more parts forming the aperture are adapted to:
- transfer weight of the artwork to a handling tool that is inserted into the aperture from a side of the artwork, the side extending transversely to a front surface displaying an artwork area; and
- assist in holding the artwork with the handling tool.

In an embodiment, the aperture extends diagonally across the body.

In an embodiment, the aperture is configured to releasably engage with the handling tool in a manner that allows holding the artwork without the assistance of a separate structure.

In an embodiment, the aperture is configured to suitably retain the handling tool, whilst holding the artwork, without the assistance of one or more fasteners.

In an embodiment, the aperture extends substantially across a lateral portion of the body.

In an embodiment, the aperture extends partway through a thickness of the body.

In an embodiment, the aperture is in the form of a channel.

In an embodiment, the aperture includes an open portion and a substantially closed portion that opposes the open portion.

In an embodiment, the closed portion is configured to be positioned adjacent the artwork whilst the open portion is positioned further away from the artwork.

In an embodiment, the aperture includes an opening to receive the handling tool that extends transversely to the open portion and/or the substantially closed portion.

In an embodiment, the aperture has an axis therethrough that defines a sliding direction for the handling tool.

In an embodiment, the one or more parts forming the aperture are substantially flat wall(s) in a direction defined by the axis.

In an embodiment, the handling tool is configured to slide through the aperture in a substantially linear manner.

In an embodiment, the aperture is configured to receive the handling tool whilst the artwork is adjacent a wall.

In an embodiment, the artwork includes a rear surface that extends transversely to the side.

In an embodiment, the rear surface includes part of an exposed artwork frame.

In an embodiment, the artwork includes four sides that extend transversely to the front surface and the rear surface.

In an embodiment, the thickness of the body is less than approximately 4 mm.

In an embodiment, the thickness of the body is less than approximately 6 mm.

In an embodiment, the colour of the body has a matt finish.

In an embodiment, the body includes a safety device to assist with retaining the handling tool.

In an embodiment, the safety device is in the form of a safety catch.

In an embodiment, the safety device includes two safety devices located either side of the aperture.

In an embodiment, the safety device forms a hole that is in communication with the aperture.

In an embodiment, the body includes a holding part. In an embodiment, the holding part is configured to be connect to a wall.

In an embodiment, the holding part is in the form of a shackle.

In an embodiment, the body includes a transport attachment.

In an embodiment, the transport attachment is configured to be connected to a transporting fixture.

In an embodiment, the transporting fixture includes a hole to receive part of the transport attachment.

In an embodiment, the body is integrally formed with an artwork frame.

In an embodiment, the aperture is located in a moving part.

In an embodiment, the moving part is configured to move from a first position to a second position in order to allow the handling tool to be received by the aperture.

In an embodiment, the moving part is biased towards the first position.

In another form the invention resides in a handling tool for an artwork handling system, the handling tool including:

- an engaging portion that is configured to engage with one or more parts forming an aperture of a bracket that is connected to an artwork, the one or more parts being adapted to transfer weight of the artwork to the engaging portion; and
- a holding portion connected to the engaging portion, the holding portion assisting in holding the artwork,
- wherein the engaging portion is configured to be inserted into the aperture from a side of the artwork, the side extending transversely to a front surface displaying an artwork area.

In an embodiment, the holding portion is configured to extend transversely away from the engaging portion.

In an embodiment, the holding portion is releasably connected to the engaging portion.

In an embodiment, the holding portion includes a positioning portion that engages with a positioning part of the engaging portion to set its orientation.

In an embodiment, the positioning portion and the positioning part include one or more splines.

In an embodiment, the holding portion is configured to be rotated to predetermined angle(s) relative to the engaging portion.

In an embodiment, the holding portion includes a positioning lock that assists with locking the holding portion to the engaging portion.

In an embodiment, the engaging portion includes a member defining an engaging axis and the holding portion is located substantially to one side of the engaging axis.

In an embodiment, the position of the holding portion assists in avoiding engagement of a user's hand with a wall when installing the artwork.

In an embodiment, the member has a forward face and a rear face and the holding portion provides a gripping portion to one side of the forward face.

In an embodiment, the holding portion extends substantially perpendicular to the engaging portion.

In an embodiment, the engaging axis is configured to substantially coincide with a central axis of the aperture.

In an embodiment, the holding portion forms a handle portion that allows a user's hand to extend through an opening to grip part of the holding portion.

In an embodiment, the holding portion includes a flat base to assist in resting the holding portion on a ground surface.

In an embodiment, the holding portion forms a block for holding the artwork above a floor.

In an embodiment, the handling tool includes a safety mechanism that releasably engages the bracket to avoid inadvertent release of the engaging portion from the aperture.

In an embodiment, the safety mechanism includes a safety release to release a portion of the safety mechanism from a safety catch associated with the bracket.

In an embodiment, the safety mechanism is biased by a spring.

In an embodiment, the safety mechanism rotates about a pivot point.

In an embodiment, the safety mechanism includes a safety latch to one side of the pivot point and the safety release to another side of the pivot point.

In an embodiment, the safety mechanism forms part of the member.

In an embodiment, the member is configured to rotate from a first position to a second position.

In an embodiment, the member in the first position is configured for engagement with the aperture.

In an embodiment, the member rotating to the second position allows the member to further align with the holding portion.

In another form, the invention resides in an artwork handling system including:

- a bracket having a body being configured to be attached to an artwork, the body having an aperture extending at least partway therethrough;
- a handling tool,
- wherein one or more parts forming the aperture are adapted to:
- transfer weight of the artwork to the handling tool that is inserted into the aperture from a side of the artwork, the side extending transversely to a front surface displaying an artwork area; and
- assist in holding the artwork with the handling tool.

In embodiment, the bracket is herein as described.

In an embodiment, the handling tool is herein as described.

In an embodiment, the artwork handling system includes a mounting bracket to assist with mounting the bracket onto a surface.

In an embodiment, the mounting bracket includes an elongate hole to assist with adjusting the mounting bracket on the surface.

In an embodiment, the artwork handling system includes a transporting fixture for assisting in transporting the artwork.

In an embodiment, the transporting fixture moves from a first position to a second position in order to lock the bracket in place.

In an embodiment, the transporting fixture includes a member that is configures to receive part of the handling tool in order to connected it to a transport container.

In another form the invention resides in a method for handling an artwork, the method including the steps of:

- moving a handling tool into an aperture of a bracket from a side of an artwork, the bracket being connect to the artwork and the side extending transversely to a front surface displaying an artwork area;
- transferring weight of the artwork to the handling tool through one or more parts forming the aperture; and
- holding the artwork with the handling tool.

In an embodiment, the step of moving the handling tool into the aperture includes sliding part of the handling tool diagonally across the bracket.

In an embodiment, the method further includes engaging a safety mechanism of the handling tool with the bracket in order to avoid inadvertent release of the handling tool from the aperture.

In an embodiment, the step of transferring weight of the artwork to the handling tool through the one or more parts forming the aperture includes holding a portion of the handling tool that extends transversely to an engaging portion that is engaging with the aperture.

In an embodiment, the step of holding the portion of the handling tool that extends transversely to the engaging portion includes moving a user's hand through an opening to grip part of the holding portion.

In an embodiment, the step of holding the artwork with the handling tool includes abutting the handling tool against a wall whilst installing the artwork.

In an embodiment, the method further includes hanging the artwork from the bracket.

In an embodiment, the step of holding the artwork with the handling tool includes positioning the artwork into a transport container.

In an embodiment, the method further includes securing the artwork in the transport container with the assistance of the bracket.

In an embodiment, the method further includes rotating part of the handling tool from a first position to a second position to allow the handling tool to be removed from the transport container.

In a further embodiment, the method further includes fixing the handling tool to the transport container for transportation.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION

Figure 1:
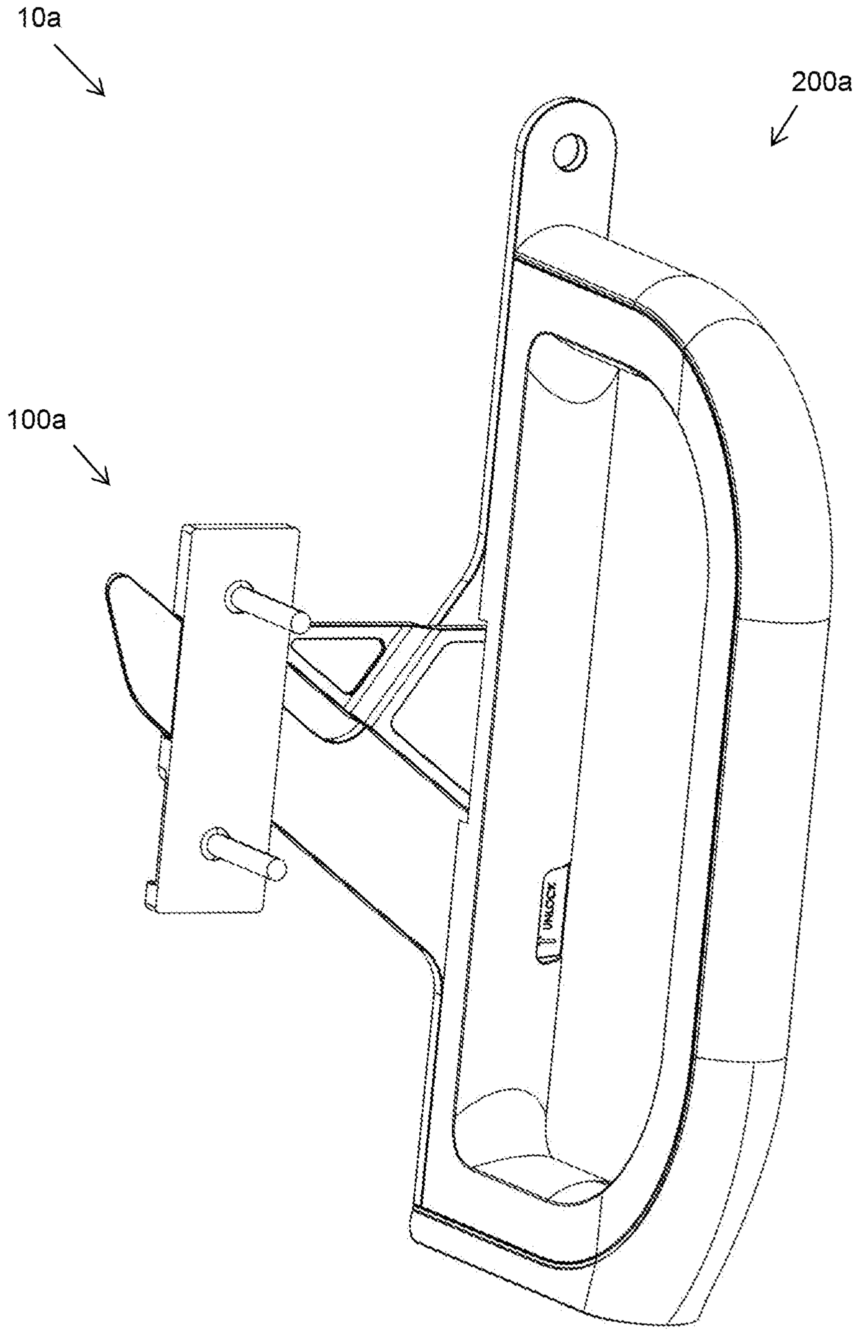
FIG. 1 illustrates a perspective view of an artwork handling system, according to an embodiment of the invention.

FIG. 1 illustrates an artwork handling system 10*a* including a bracket 100*a* and a handling tool 200*a*, according to embodiment of the invention. In this regard, the use of a reference numeral followed by a lower case letter typically indicates alternative embodiments of a general element identified by the reference numeral in this specification. Thus for example bracket 100*a* is similar to but not identical to bracket 100*b*. Further, references to an element identified only by the numeral refer to all embodiments of that element. Thus for example a reference to bracket 100 is intended to include both the bracket 100*a* and the bracket 100*b*.

Figure 2:
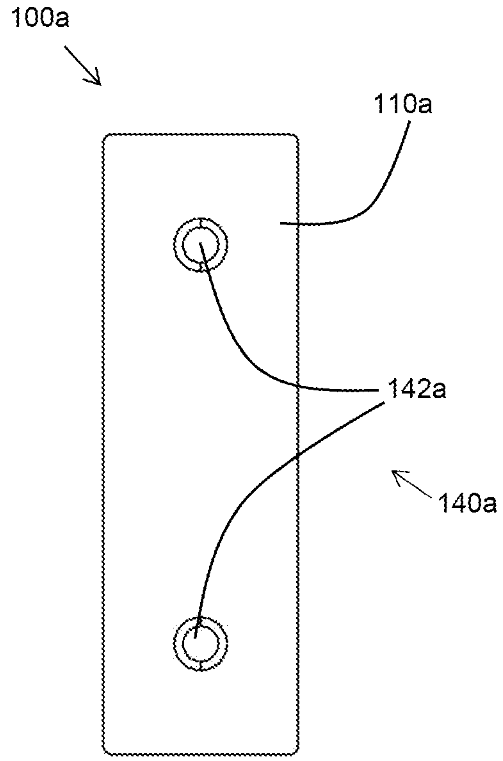
FIG. 2 illustrates a front view of a bracket of the artwork handling system shown in FIG. 1.
Figure 3:
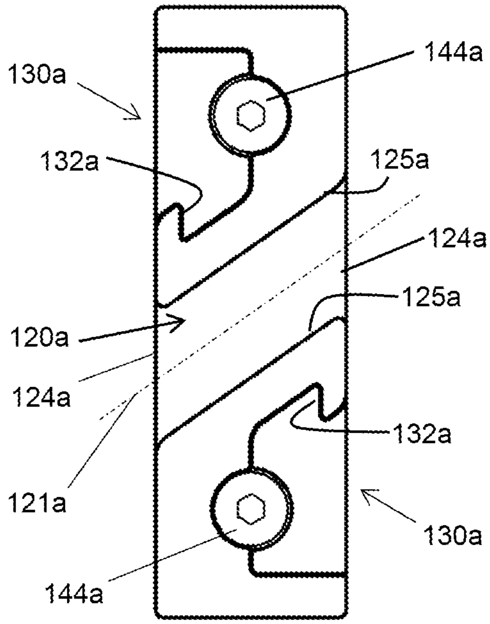
FIG. 3 illustrates a rear view of the bracket shown in FIG. 2.
Figure 4:
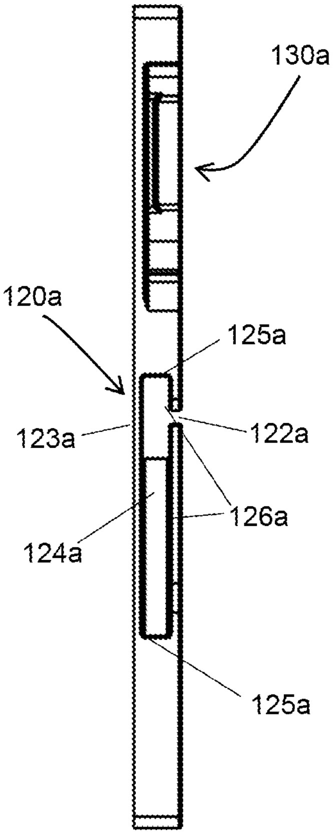
FIG. 4 illustrates a side view of the bracket shown in FIG. 2.

The bracket 100*a* is shown further in FIGS. 2 to 4. The bracket includes a body 110*a*. The body 110*a* is substantially rectangular. On this basis, the body 110*a* has a lateral direction and a longitudinal direction. The thickness of the body 110*a* in this embodiment is approximately 4 mm. This thickness allows the body 110*a* to be substantially inconspicuous whilst an artwork is being displayed. The body

110*a* is a matt colour, preferably black. The body 110*a* is also made from titanium but, as will be appreciated by a person skilled in the art, other materials such as steel may be used.

The body 110*a* includes an aperture 120*a*. The aperture 120*a* includes a central axis 121*a*. The aperture 120*a* extends from one longitudinal side of the body 110*a* to another longitudinal side. The aperture 120*a* extends diagonally across the body 110*a*. In this regard, the axis 121*a* extends transversely to the longitudinal and lateral sides of the body 110*a*. The aperture 120*a* forms a channel across the body 110*a* and extends partway through the thickness of the body 110*a*. Accordingly, the aperture 120*a* includes an open end 122*a* and a close end 123*a*. The closed portion 123*a* forms part of a wall that is configured to connect/abut with an artwork. The aperture 120*a* includes openings 124*a* at either end, adjacent the longitudinal sides of the body 110*a*.

Further parts forming the aperture include two side walls 125*a*. The side walls 125*a* are substantially flat and extend diagonally across the body 110*a*. The side walls 125*a* extend perpendicularly from at least one side of the body 110*a*. Transverse walls 126*a* extend from the side walls 125 to partially close the open portion 122*a*. The ends of the transverse walls 126*a* assist in providing guidance to the handling tool 200*a*. To this end, as further outlined below, the axis 121*a* provides a sliding direction for the handling tool 200*a*.

The bracket 100*a* further includes a safety device 130*a*. The safety device 130*a* assists with retaining the handling tool 200*a*. The safety device includes a catch 132*a*. As shown in further detail in FIG. 3, the body includes two catches 132 to allow the bracket to be orientated in an up or down position on one side of the artwork. In further embodiments, the bracket 100*a* may be designed to be located on either a left or right side of the artwork.

The bracket 100*a* also includes an attaching portion 140*a*. The attaching portion 140*a* in this embodiment includes holes 142*a*. The holes 142*a* are configured to receive fasteners 144*a*. In this regard, it will be appreciated further from FIG. 6 that the fasteners 144*a* can be connected to a rear surface of an artwork. Accordingly, the brackets 100*a* are normally located adjacent sides of the artwork. To handle the artwork, the handling tool 200*a* is therefore inserted into the aperture 120*a* from a side of the artwork. That is, the handling tool 200*a* is inserted from a side, behind the artwork, whereby the side extends transversely (ie, in a non-parallel manner) to a front surface displaying the artwork area. In other words, the handling tool 200*a* moves through an imaginary plane extending perpendicular to the front of the artwork to allow it to engage with the aperture 120*a*. This is outlined in greater detail below. This design avoids having to touch the front or sides of the artwork, meaning there is no user contact with the artwork whatsoever.

Figure 5:
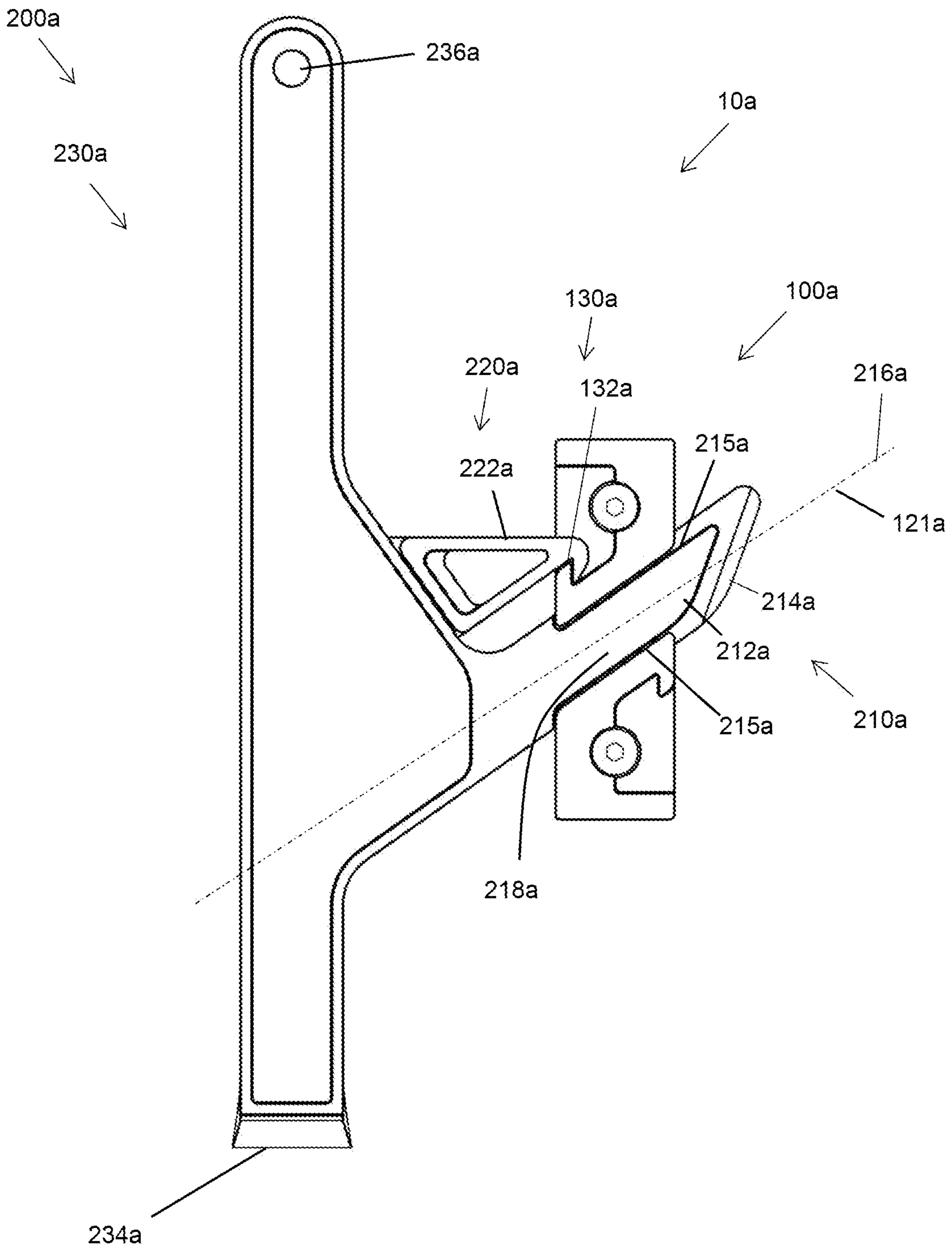
FIG. 5 illustrates a rear view of the artwork handling system shown in FIG. 1.
Figure 6:
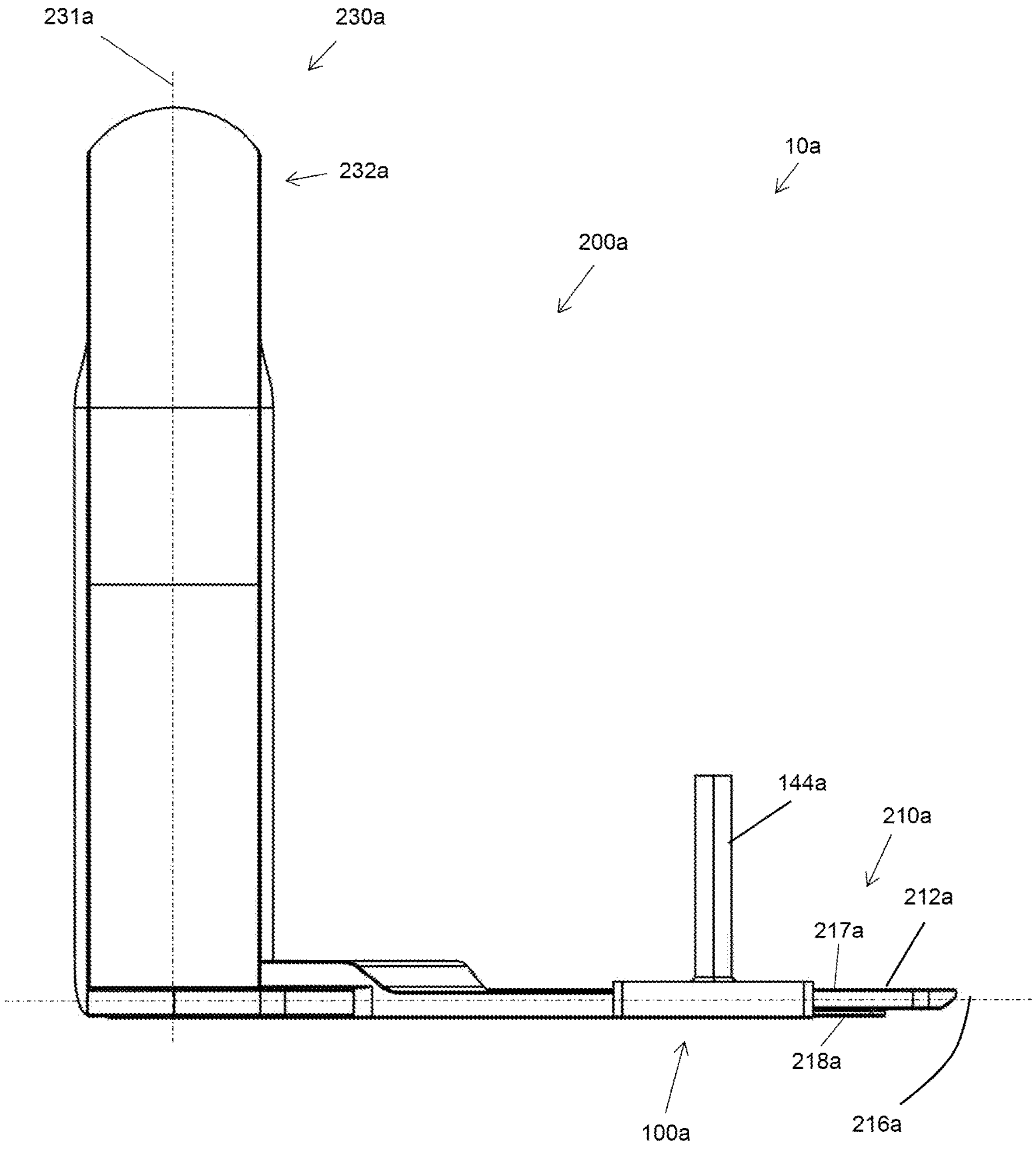
FIG. 6 illustrates a top view of the artwork handling system shown in FIG. 1.
Figure 7:
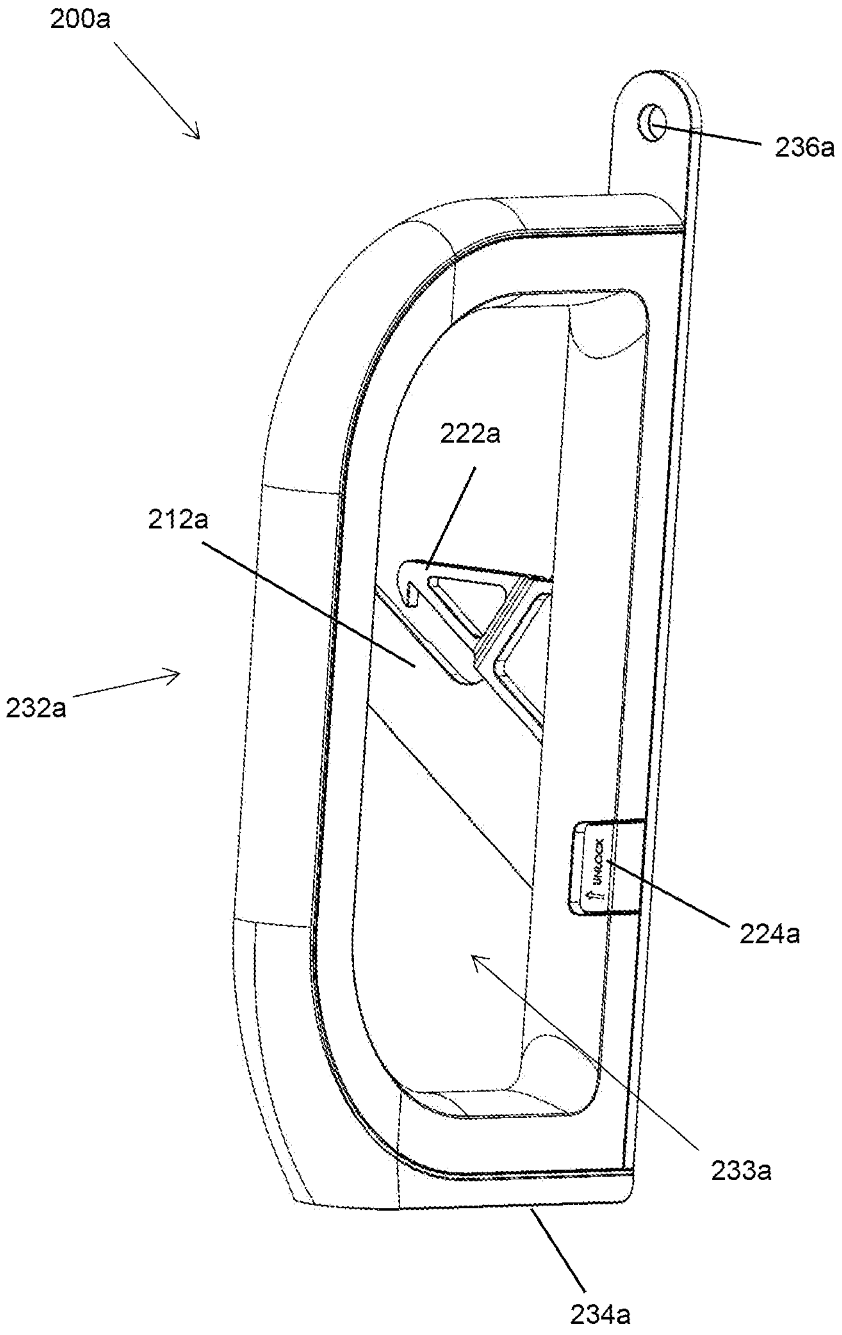
FIG. 7 illustrates a perspective view of a handling tool of the artwork handling system shown in FIG. 1.

FIGS. 5 to 7 illustrate the handling tool 200*a* according to an embodiment of the invention. The handling tool 200*a* includes an engaging portion 210*a*. The engaging portion 210*a* is configured to engage with the aperture 120*a*. That is, the engaging portion 210*a* comprises a member 212*a* that is configured to slide into engagement with the aperture 120*a*. The member 212*a* extends in a diagonal manner relative to a horizontal plane. The angle of the member 212*a* assists in (amongst other things): i) reducing the moment forces on the member 212*a*; ii) preventing the member 212*a* from inadvertently releasing from the aperture 120*a* whilst an artwork is being carried due to the weight of the artwork thereon; and iii) ensuring the artwork is fixed in place during shipping, including when the artwork is inverted (which would not necessarily be the case with a straight/vertical member). The member 212*a* is configured to extend laterally though one side of the aperture 120*a* to another side thereof.

The member 212*a* includes a tapered edge 214*a*. The tapered edge 214*a* assists in inserting the member 212*a* into the aperture 120*a*. The member 212*a* also includes guiding surfaces 215*a*. The guiding surfaces 215*a* assist in forming a ridge along the member 212*a*. The guiding surfaces 215*a* are configured to engage with the end portions of transverse walls 126*a* to assist with guiding movement of the engaging portion 210*a* within the aperture 120*a*. Parts of the member 212*a*, adjacent the guiding surfaces 215*a*, engage with the transverse walls 126 to prevent the member 212*a* from exiting the aperture through the open portion 126*a*. The engaging portion 210*a* moves along the engaging axis 216*a* as it engages with the aperture 120*a*. In this regard, the engaging axis 216*a* coincides with the axis 121*a* whilst the member 212*a* slides along part(s) forming the aperture 120*a*.

The handling tool 200*a* further includes a safety mechanism 220*a*. The safety mechanism 220*a* is configured to releasably engage the safety device 130*a* to avoid inadvertent release of the engaging portion 210*a* from the aperture 130*a*. The safety mechanism 220*a* includes a safety latch 222*a*. The safety latch 222*a* is biased by a spring that assists in moving the safety latch 222*a* into engagement with the safety catch 132*a*. That is, the spring rotates the safety latch 222*a* towards a retaining position such that, in response to the safety latch 222*a* moving over the safety catch 132*a*, the safety latch 222*a* is forced into the retaining position. To release the safety latch 222*a* from its retaining position, the safety release 224*a* is engaged to allow the safety latch 222*a* to rotate to a release position. With the safety mechanism 220*a* in the release position, the engaging portion 210*a* may be removed from the aperture 130*a*.

The holding portion 230*a* assists a user in holding the artwork. As shown further in FIG. 6, the holding portion 230*a* extends away from its connection with the engaging portion 210*a* along extending axis 231*a*. That is, the holding portion 230*a* extends transversely away from the engaging portion 210*a*. This leaves the holding portion 230*a* located substantially to one side of the engaging axis 216. To further elaborate, the engaging member 212*a* includes a forward face 217*a* and a rear face 218*a* and the holding portion is located to one side of the forward face 217*a*. This is shown more clearly in FIG. 6 and effectively the engaging portion 210*a*/holding portion 230*a* form an 'L' shape. In other words, the engaging portion 210*a* extends substantially perpendicular to the holding portion 230*a*. As outlined further below, this shape assists a user in avoiding: i) their hand engaging/being crushed against a wall; ii) having to touch the artwork during handling; and iii) accidental or inadvertent contact with the artwork.

As shown further in FIG. 7, the holding portion 230*a* includes a gripping portion 232*a*. The gripping portion 232*a* in this embodiment includes a rubber coating for ergonomic purposes. The gripping portion 232*a* forms a 'D shape' to allow a user's hand to extend through opening 233*a* to suitably grip the gripping portion 232*a*. The holding portion 230*a* also includes a base portion 234*a* that is substantially flat. The base portion 234*a* can be rested on a ground surface during handling the artwork if required.

The holding portion 230*a* further includes a mounting portion 236*a*. The mounting portion 236*a* includes a hole. The mounting portion 236*a* is configured to connect to a transportation container. In this regard, the handling tool 200*a* is adapted to assist with transportation of an artwork by providing a suitable connection between the artwork and the transportation container. In further embodiments, as outlined below, the handling tool may be removed for transportation.

During use, brackets 100*a* are connected to a rear surface of an artwork, using the fasteners 144*a*, adjacent the left and right sides of the artwork. The bracket 100*a* is configured for the right side of the artwork but it would be appreciated that, in further embodiments, it may be adapted to the left side. The apertures 120*a* are positioned such that the axes 121*a* converge towards a middle portion of the artwork thereabove. With the brackets 100*a* in place, the member 212*a* may be inserted into the apertures 120*a*, from the left/right sides of the artwork, in order to begin handling the artwork. As the member 212*a* moves/slides through the aperture 120*a* it is guided by (amongst other things) the guiding surfaces 215*a* of the member 212*a*. At a suitable point, the member 212*a* also includes a stop to prevent further insertion into the aperture 120*a*. Following this, the safety mechanism 220*a* is engaged with the safety device 130*a*.

With the above in mind, it will be appreciated that the member 212*a* moves along aperture 120*a* whilst a user typically holds the holding portion 230*a*. Touching the artwork is not required. Once the member 212*a* is engaged with the aperture 120*a* at a suitable point, users may lift the artwork from both sides of the artwork. Following this, the artwork may be, for example, installed on a wall for display. Due to the structure of the holding portion 230*a*, relative to the member 212*a*, the users may install the work on a wall without having, for instance, their hand(s) collide with the wall as they wrap their hand(s) around a handling tool. This assists in more easily installing the artwork in a safe manner. Similarly, whilst the artwork is removed from a wall and placed into a transporting container (or removed), the handling tool 200*a* can suitably be used to avoid contact with the artwork whilst maintaining a safe and ergonomic grip of the artwork.

Figure 8:
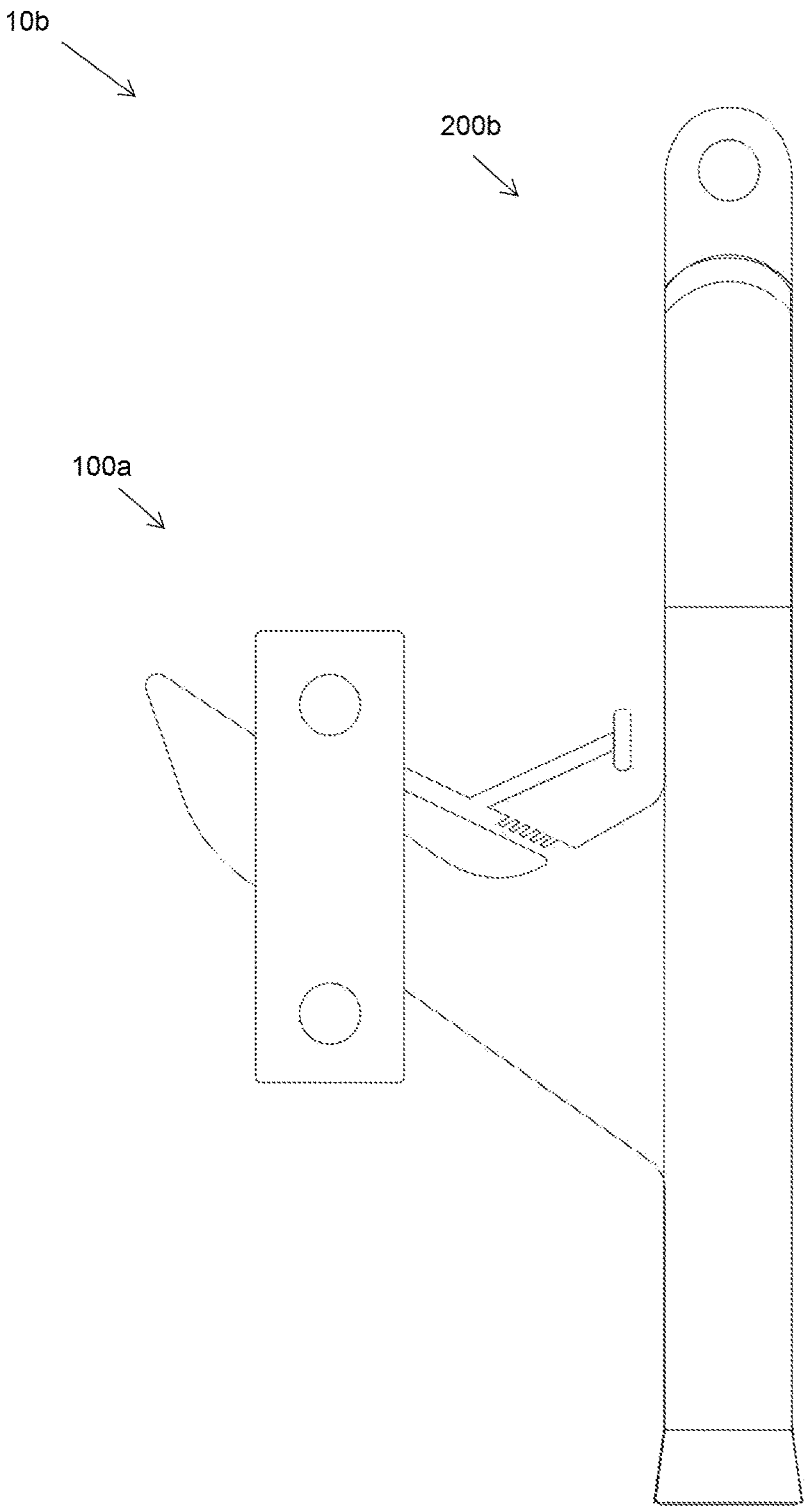
FIG. 8 illustrates a front view of a further artwork handling system, according to an embodiment of the invention.
Figure 9:
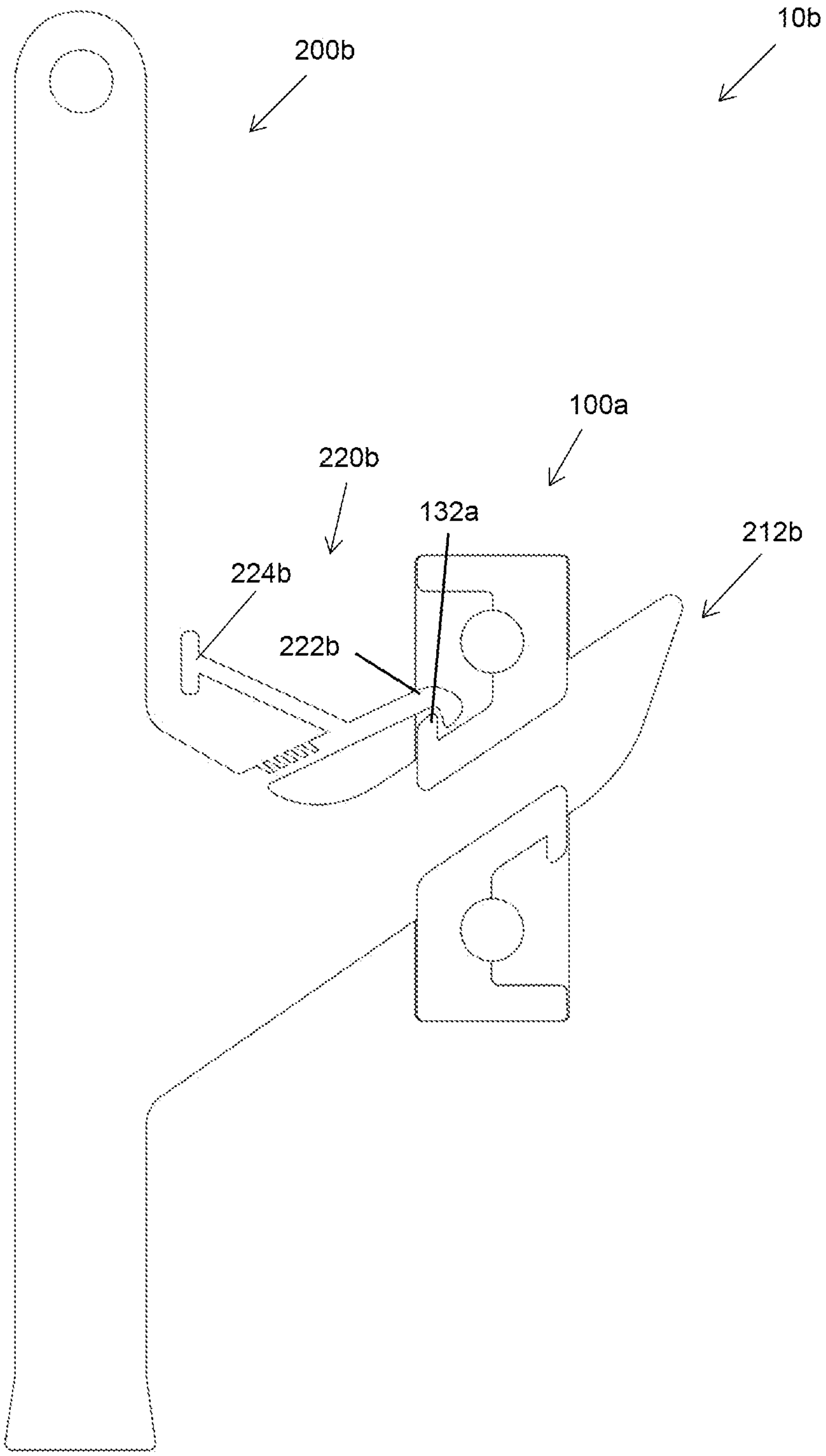
FIG. 9 illustrates a rear view of the further artwork handling system shown in FIG. 8.

FIGS. 8 and 9 illustrate a further artwork handling system 10*b*, according to an embodiment of the invention. The further artwork handling system 10*b* includes the same bracket 100*a* but some slight modifications have been made to the handling tool 200*b*. In particular, the safety mechanism 220*b* is formed with the member 212*b*. The safety mechanism 220*b* includes safety latch 222*b*. The safety latch 222*b* extends from a portion of the member 212*b*. Extending from the safety latch 222*b* is the safety release 224*b*. By pressing on the safety release 224*b*, it would be appreciated that the safety latch 222*b* will resiliently flex to a position that allows it to release from the safety catch 132*a*. This simplifies the safety mechanism 220*b*, if required.

Figure 10:
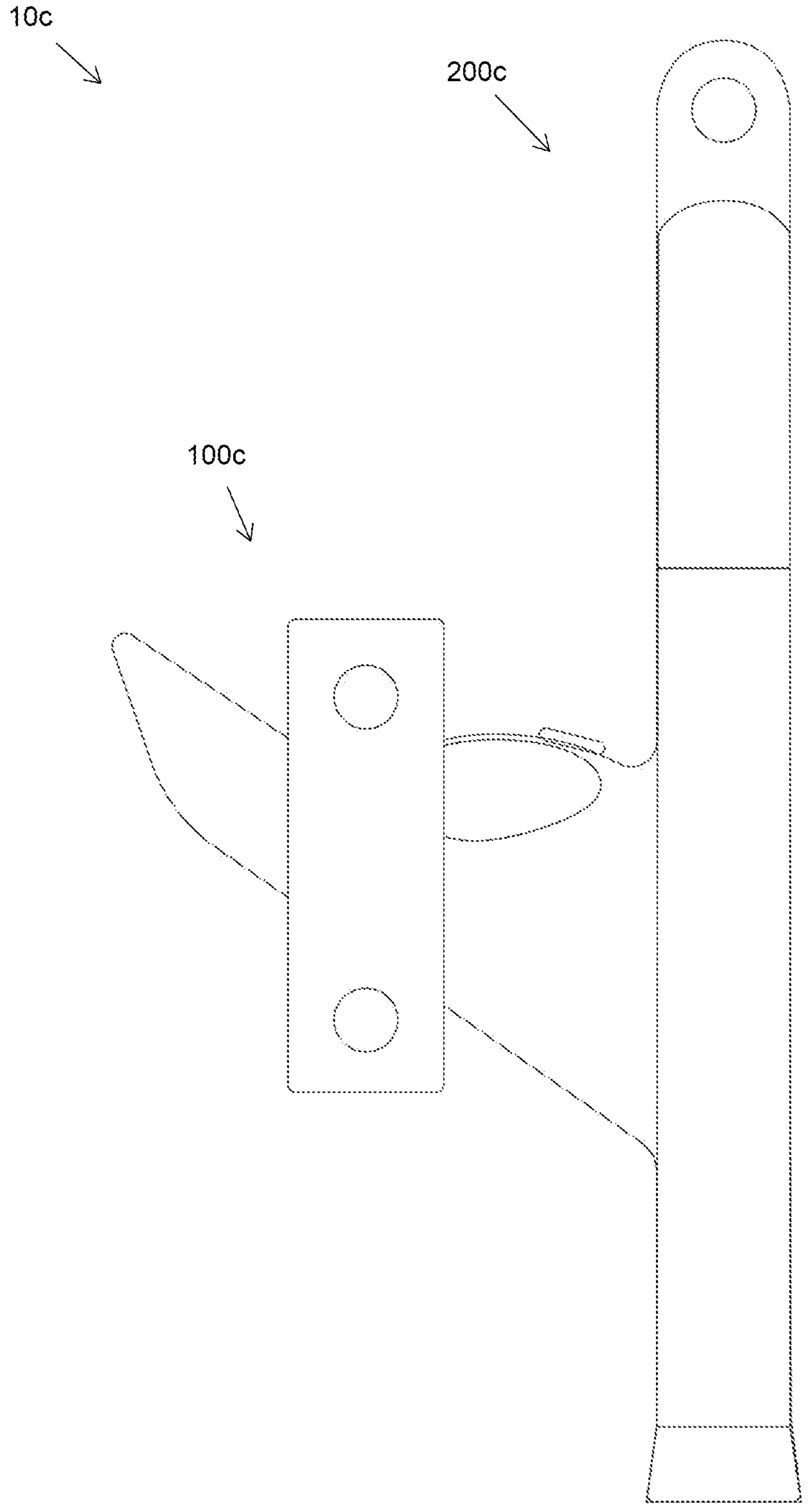
FIG. 10 illustrates a front view of another artwork handling system, according to an embodiment of the invention.
Figure 11:
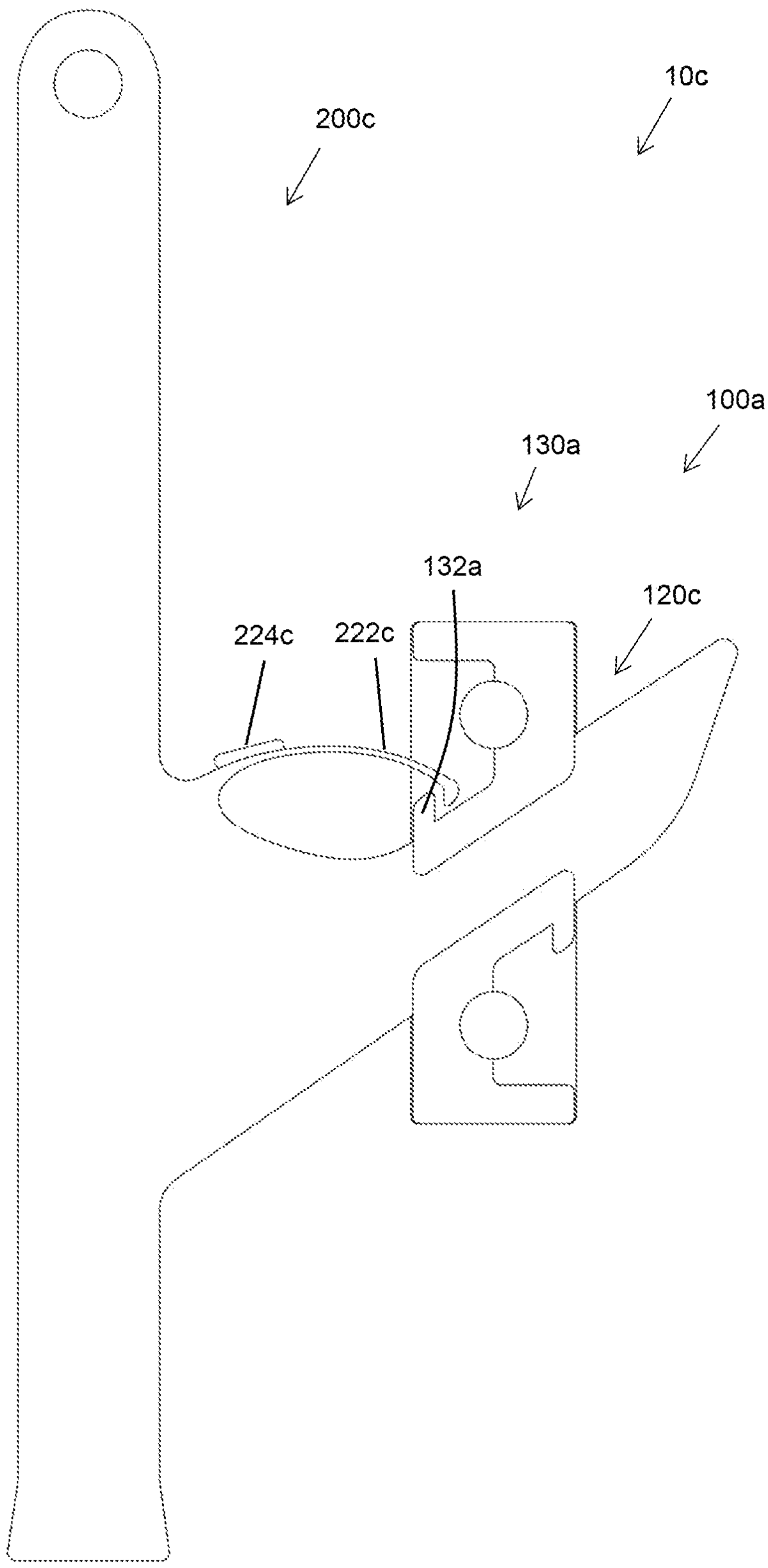
FIG. 11 illustrates a rear view of the artwork handling system shown in FIG. 10.

FIGS. 10 and 11 illustrate another artwork handling system 10*c*, according to an embodiment of the invention. The artwork handling system 10*c* includes bracket 100*a*. The safety device 130*a* is configured to receive safety latch 222*c* of the handling tool 200*c*. The safety latch 222*c* is a relatively thin member that is resiliently flexible. The safety latch 222*c* may be made from, for example, a (spring) steel. In order to release the safety latch 222*c* from the safety catch 132*c*, the safety release 224*c* is pressed, which allows the safety latch 222*c* to rotate/flex to a position where it can be released from the safety catch 132*c*.

Figure 12:
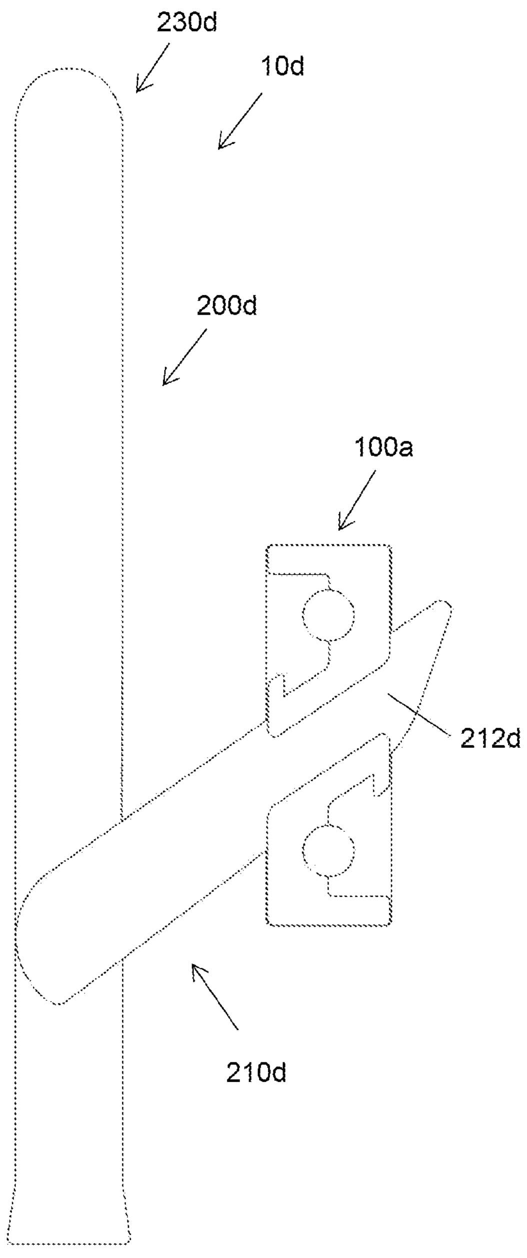
FIG. 12 illustrates a rear view of a handling tool in a first configuration, according to an embodiment of the invention.
Figure 13:
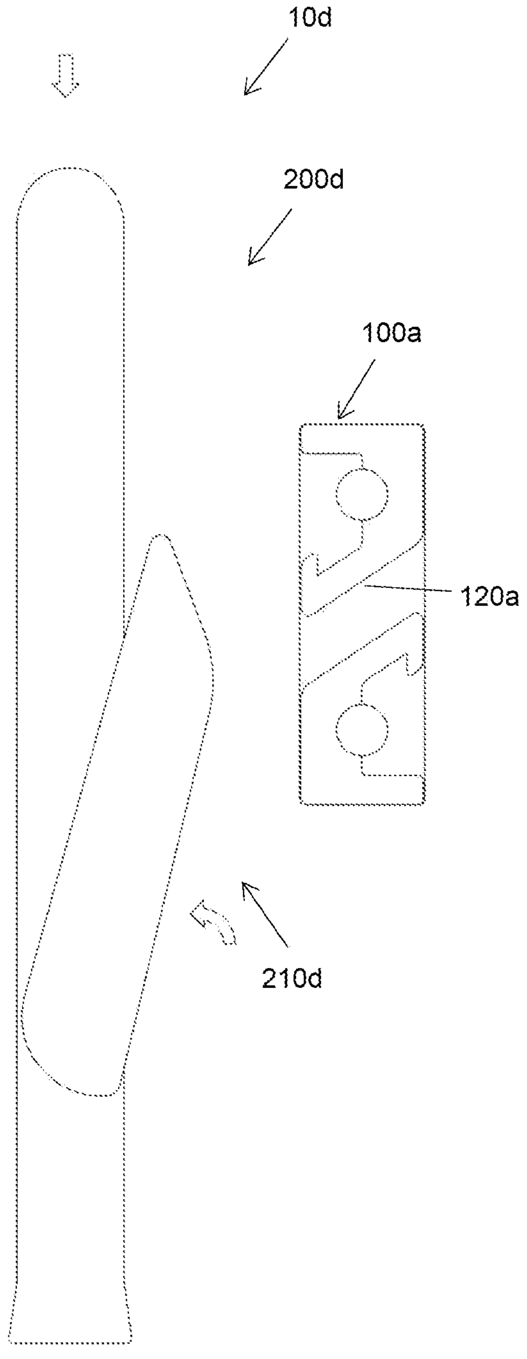
FIG. 13 illustrates a rear view of the handling tool in FIG. 12 in a second configuration.

FIGS. 12 and 13 illustrate a further artwork handling system 10*d* including the bracket 100*a* and a different handling tool 200*d*. The handling tool 200*d* includes an engaging portion 210*a* that is able to move, relative to the handling portion 230*d*, in order to adjust the relative angle thereto. This allows the handling tool 200*d* to form a thinner profile, if required, in order to assist in (for example) removing the handling tool 200*d* from the bracket in the confines of a transportation container. To further elaborate, the member 212*d* may rotate from a first position, where it is configured to engage with the aperture 120*a* of the bracket 100*a* (as shown in FIG. 12), to a second position where it largely aligns with the holding portion 230*d*. This allows the handling portion 230*d* to move a shorter linear distance to disengage the member 212*d* from the aperture 120*a*.

Figure 14:
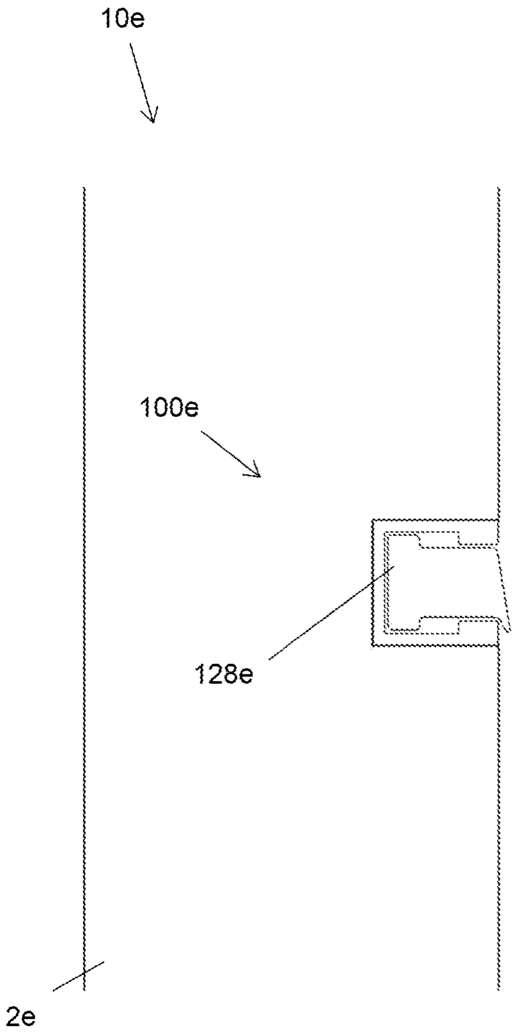
FIG. 14 illustrates a side sectional view of a bracket in a first configuration, according to an embodiment of the invention.
Figure 15:
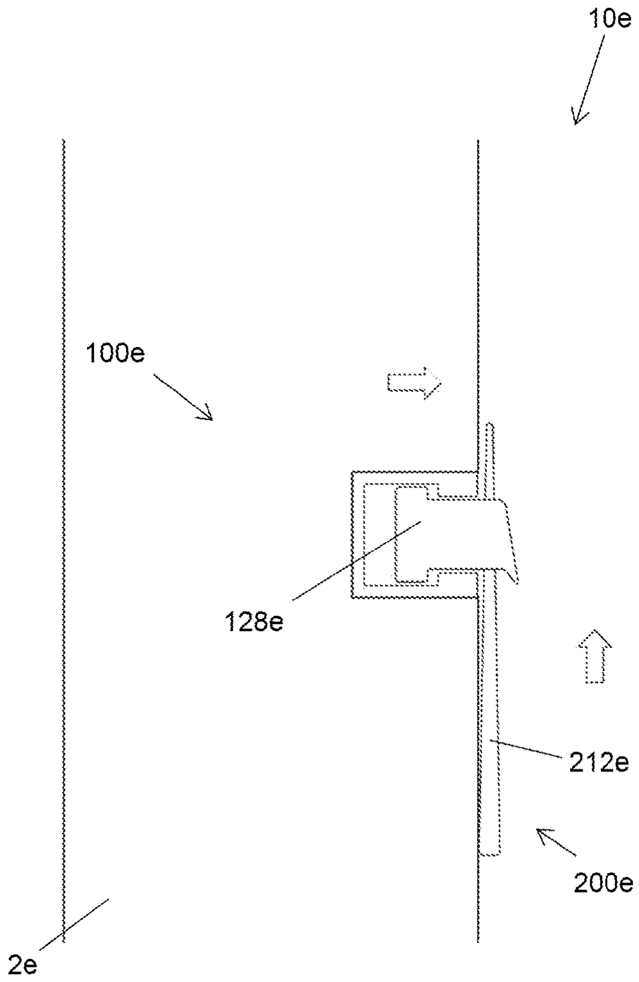
FIG. 15 illustrates a side sectional view of the bracket in FIG. 14 in a second configuration that is engaged with a handling tool.

FIGS. 14 and 15 illustrate an artwork handling system 10*e* where bracket 100*e* is integrated into an artwork frame 2*e*. The bracket 100*e* is located on a rear/side surface of the artwork frame 2*e* (or artwork). The front surface of the artwork includes an artwork area. The artwork area includes visual arts. The visual arts form the key area observed by observers when the artwork is displayed.

The bracket 100*e* includes a moving part 128*e* contained within a housing. The moving part 128*e* may be biased towards one side of the housing/artwork frame 2*e*. The moving part 128*e* includes an aperture (not shown) to receive a member 212*e* of the handling tool 200*e*. For ease of illustration, other parts of the handling tool (eg, the holding portion) are not shown. As demonstrated further in FIG. 15, the member 212*e* can move through the aperture of the bracket 100*e*, from a lower side of the artwork, and move the moving part 128*e* out from the frame 2*e*. In the position shown in FIG. 15, the handling tool 200*e* may be used to handle the artwork to position it on a wall or in a transportation container. Upon removing the member 212*e* from the aperture, the moving part 128*e* may move back into its initial position shown in FIG. 14. This allows an even lower profile bracket 100*e* that may be installed almost flush on a wall, meaning the bracket 100*e* is almost invisible whilst the artwork is being displayed. In further embodiment, it would also be appreciated that, for example, the member 212*e* may be inserted through a side of the frame 2*e* in order to engage with the bracket 100*e*.

Figure 16:
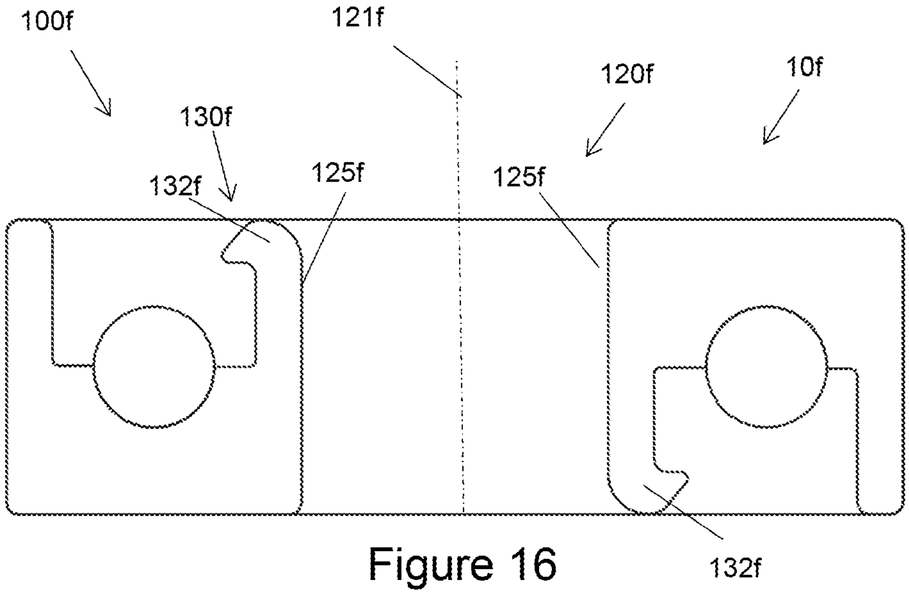
FIG. 16 illustrates a rear view of a further bracket, according to an embodiment of the invention.
Figure 17:
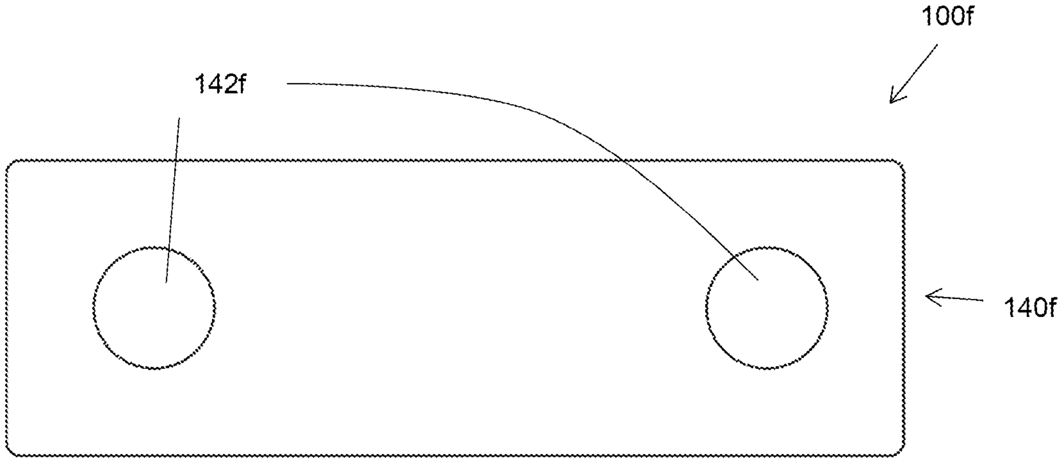
FIG. 17 illustrates a front view of the further bracket shown in FIG. 16.

FIGS. 16 and 17 illustrate a further bracket 100*f* for the artwork handling systems 10*f*. The bracket 100*f* includes an aperture 120*f* that extends straight (ie, not diagonally) across the bracket 100*f*. The aperture 120*f* therefore includes walls 125*f* that extend perpendicularly across the bracket 100*f*, relative to the longitudinal sides of the bracket 100*f*. The bracket 100*f* is configured to be connected adjacent a lower side of an artwork, on the back side of an artwork frame 2*f* (shown substantially as transparent). That is, the handling tool 200*f* is inserted from a (lower) side 3*f* of the artwork whereby the side 3*f* extends transversely to a front surface displaying the artwork area 4*f*. The artwork area 4*f* extends over the frame 2*f*. This allows the artwork to be lifted from the bottom edge/portion thereof, which is particularly helpful for large artworks where multiple people may be needed to carry the artwork. To this end, the front face of the bracket 100*f*, shown in FIG. 17, is abutted against the rear of the artwork frame 2*f*. The holes 142*f* of the attaching portion 140*f* are used to receive fasteners (eg, countersunk screws etc) to fix the bracket 100*f* to the artwork frame. When the bracket 100*f* is attached to the artwork, the axis 121*f* of the aperture extends in a vertical direction.

The bracket 100*f* also includes safety devices 130*f*. The safety devices 130*f* are located on either side of the bracket 100*f* to allow the bracket 100*f* to be located in either orientation, along a lower portion of the artwork frame, to receive a safety mechanism 220*f* of the handling tool 200*f*. The design of the bracket 100*f* prevents user error in the form of installing the bracket 100*f* in the wrong orientation. In comparison to other safety devices, the safety devices 130*f* include substantially straight walls, parallel to the axis 121*f*, supporting the safety catches 132*f*.

Figure 18:
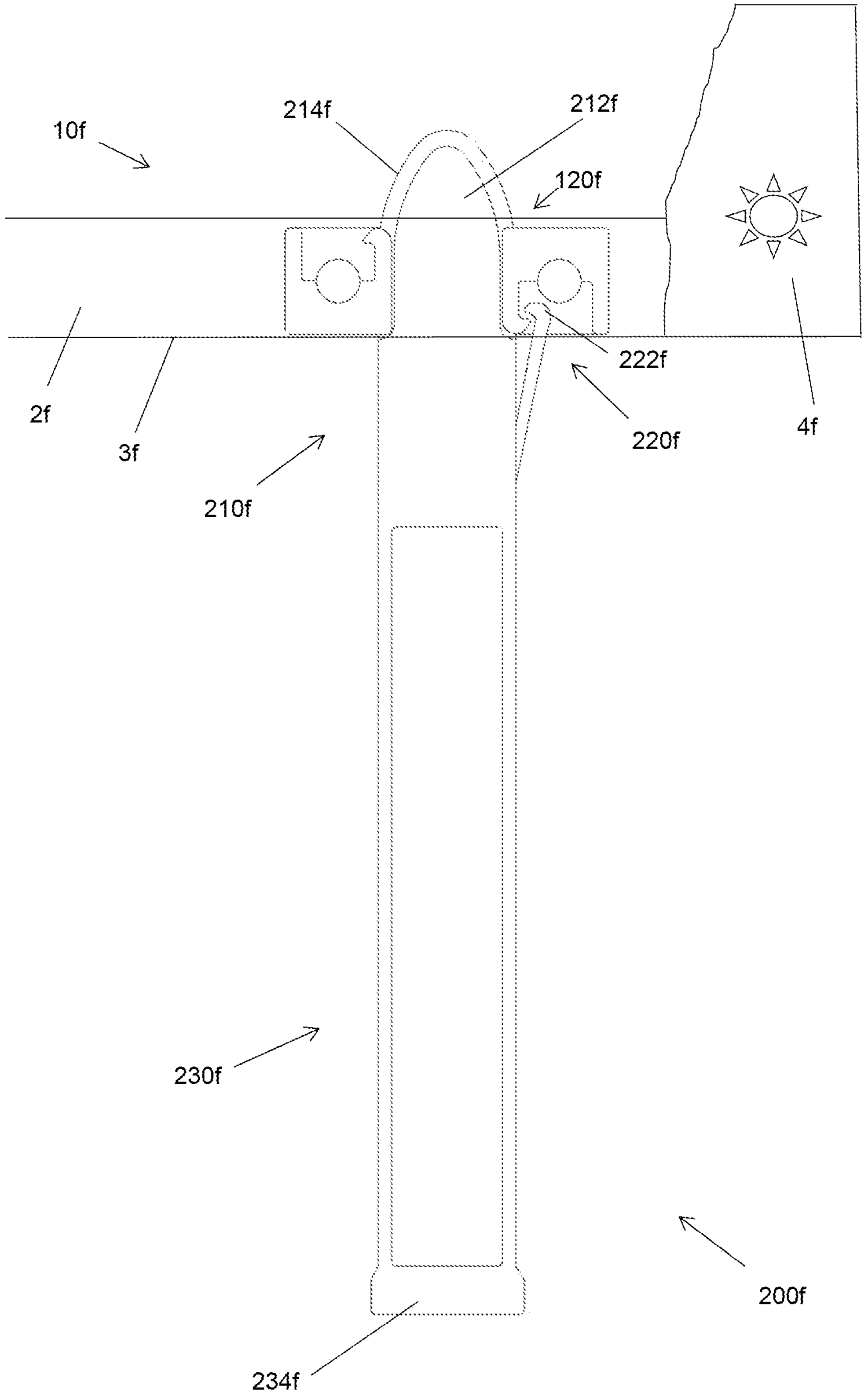
FIG. 18 illustrates a rear view of a separate handling tool engaging the further bracket in FIG. 16.
Figure 19:
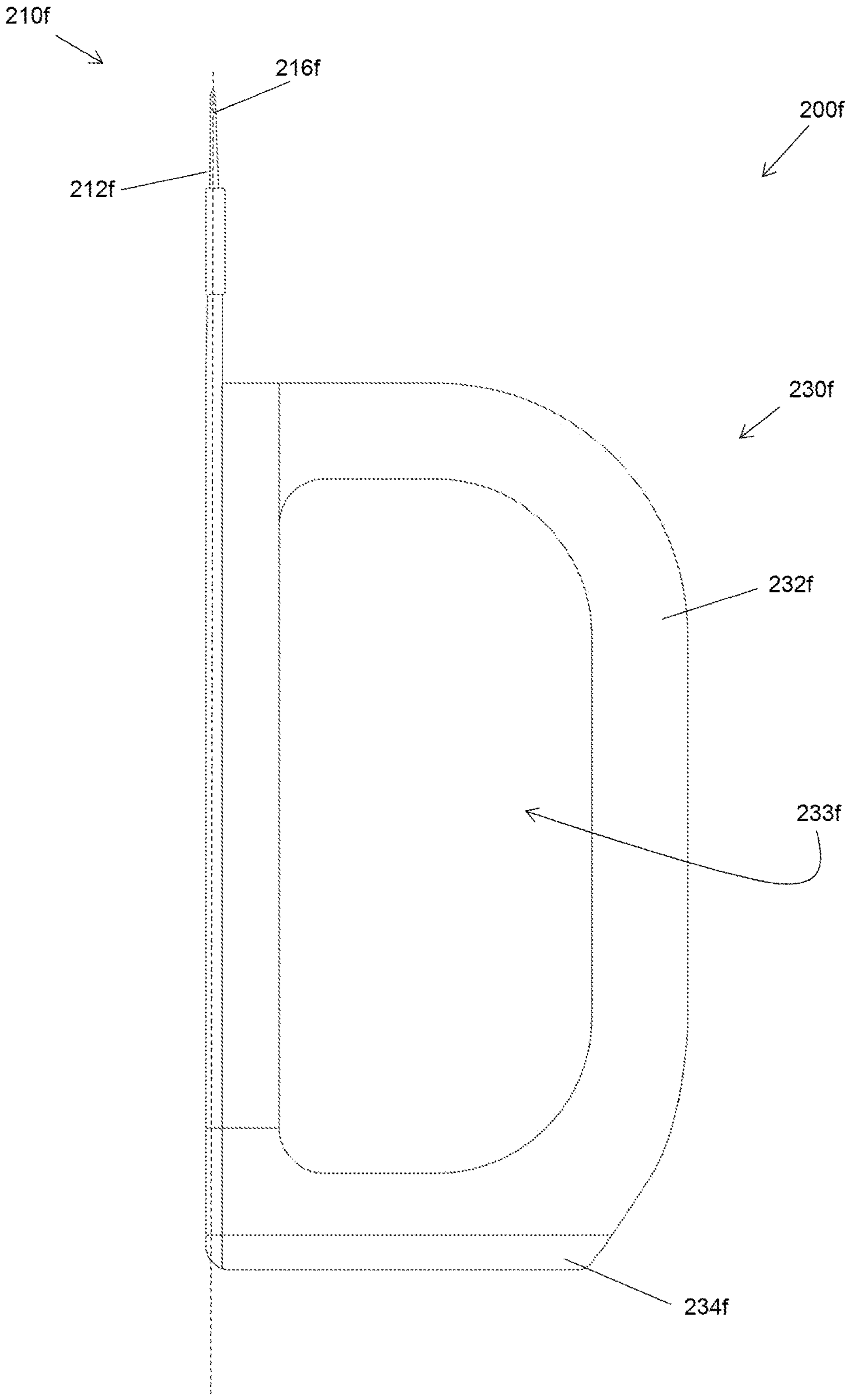
FIG. 19 illustrates a side view of the separate handling tool engaging the further bracket in FIG. 16.

The handling tool 200*f* is shown further in FIGS. 18 and 19. The engaging member 212*f* of the handling tool 200*f* includes a radiused edge 214*f* that forms a taper. The safety latch 222*f* of the safety mechanism 220*f* extends transversely from the member 212*f* in order to be in a position to engage the safety catch 132*f*. The holding portion 230*f* extends perpendicularly (ie, an example of a transverse angle) away from the engaging member 212*f* in one plane, as shown in FIG. 19, but aligns with the engaging member 212*f* in another plane, as shown in FIG. 18. As evident in FIG. 19, this allows the holding member 230*f*, and particularly the gripping portion 232*f*, to be located to one side of the engaging axis 216*f*. The handling tool 200*f* also includes a base portion 234*f* that provides a foot for the artwork. This allows the artwork to be rested on the ground with the base portion 234*f* acting as a foot. The gripping portion 232*f* and/or the base portion 234*f* may be made of, for example, a suitable rubber.

Figure 20:
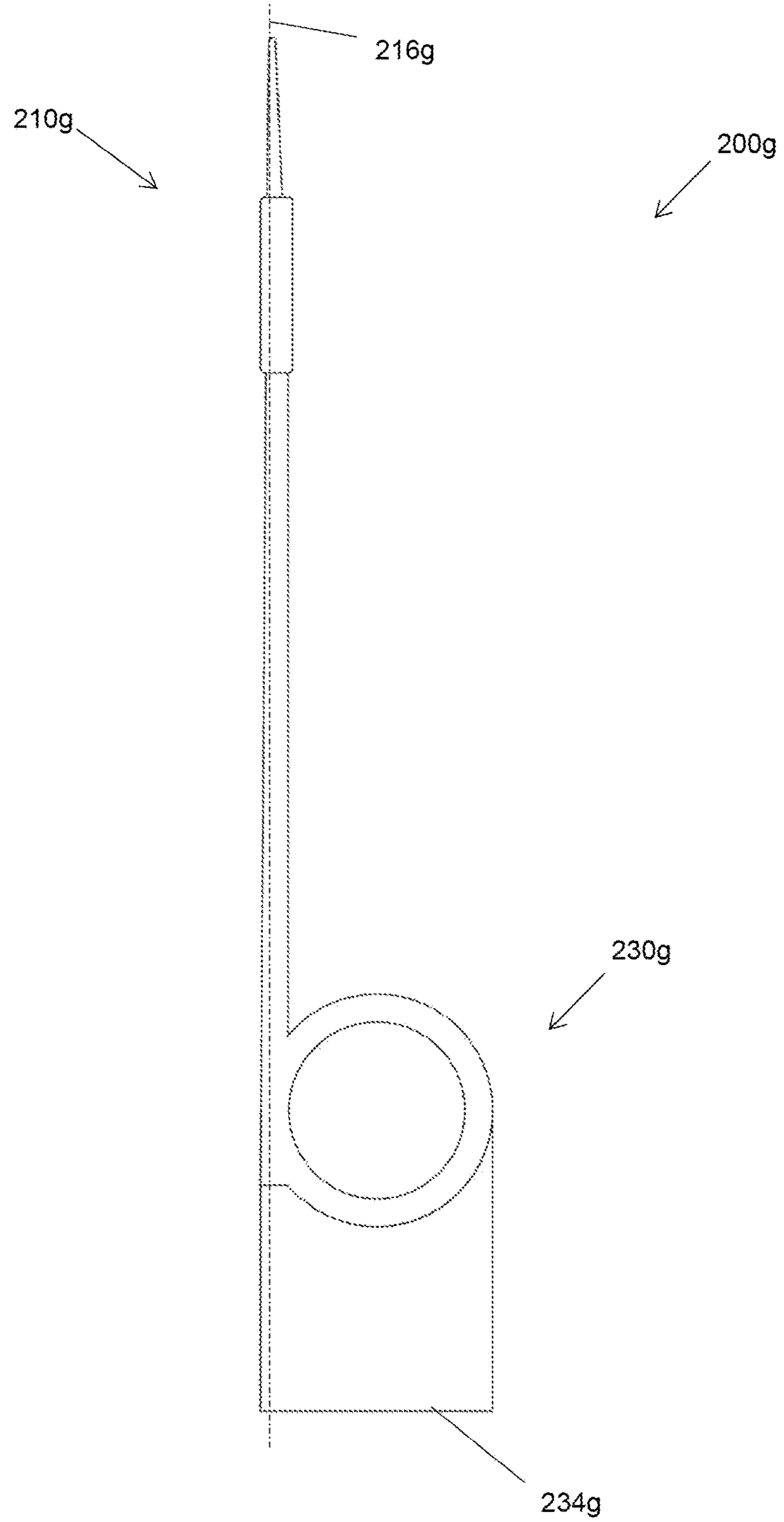
FIG. 20 illustrates a further handling tool in the form of a footing device, according to an embodiment of the invention.

FIG. 20 illustrates another handling tool 200*g* in the form of a chock-type device that assists in providing a footing to stand an artwork, for example, adjacent a wall during handling. The holding device 200*g* includes an engaging portion 210*g* that is configured to engage with the aperture 120*f* of bracket 100*f*. The holding device 200*g* therefore provides an engaging axis 216*g*. Located to one side of the engaging axis 216*g* is the holding portion 230*g*. The holding portion 230*g* provides a suitable base portion 234*g* (eg, a rubber stopper) that assists holding an artwork thereabove. As will be appreciated, more than two holding devices 200*g* can be used to stabilise an artwork in order to rest it above a ground surface with the assistance of the base portions 234*g*. In a similar manner to the other holding device 200, the holding device 200*g* positions the artwork at least 100 mm above the ground when rested on the base portion 234*g*. This assists alleviating risk associated with, for example, flooding around the artwork.

Figure 21:
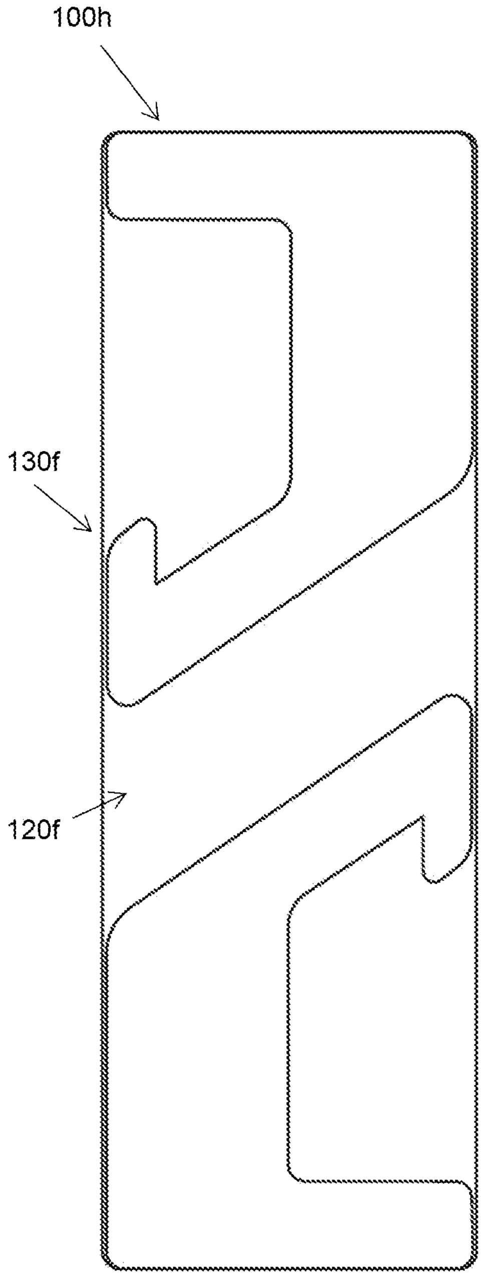
FIG. 21 illustrates a rear view of a fixed bracket, according to an embodiment of the invention.
Figure 22:
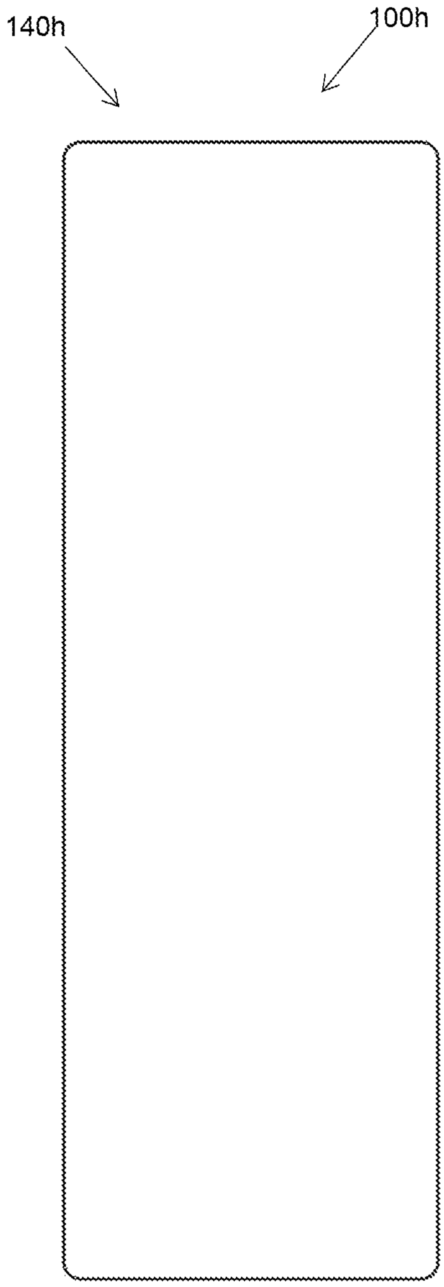
FIG. 22 illustrates a front view of the fixed bracket shown in FIG. 21.
Figure 23:
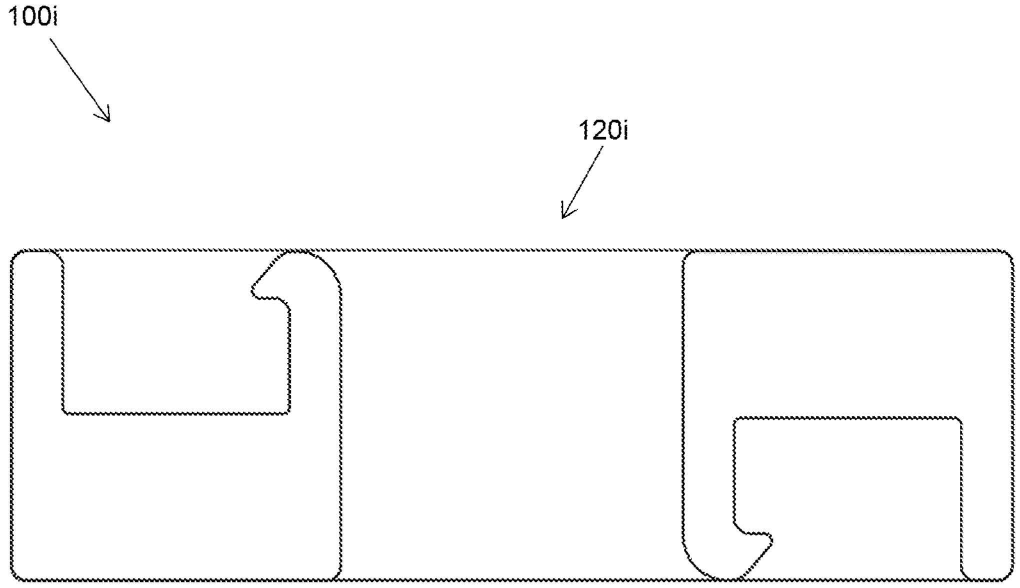
FIG. 23 illustrates a rear view of another fixed bracket, according to an embodiment of the invention.
Figure 24:
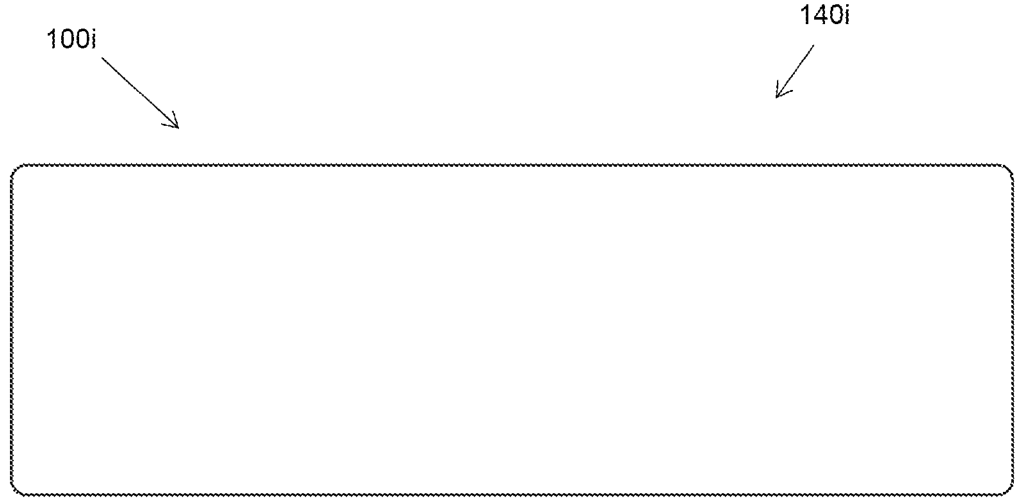
FIG. 24 illustrates a front view of the other fixed bracket shown in FIG. 23.

FIGS. 21 and 22 illustrate a further bracket 100*h* that is configured to be fixed to an artwork. The bracket 100*h* includes similar features to the bracket 100*a* (eg, aperture 120*f*, safety device 130*f* etc). However, in comparison to bracket 100*a*, the bracket 100*h* does not include an attachment portion 140*h* involving releasable fasteners. Rather, the front surface of the bracket 100*h*, shown in FIG. 22, is fixed to the artwork with an adhesive. The adhesive may include a glue, solder, brazing etc. to ensure the bracket 100*h* is rigidly attached to the artwork. This is useful in situations where fasteners are not able to be fitted to the artwork structure because of, for instance, substrate depth or material constraints. In this regard, FIGS. 23 and 24 illustrate a similar bracket 100*i* to bracket 100*h*, but the aperture 120*i* is akin to aperture 120*f* of the bracket 100*f*. That is, the aperture 120*i* extends perpendicularly across the bracket 100*f* from the longitudinal sides thereof. The attachment portion 140*i* is substantially the same as attachment portion 140*h* in that parts of the face of the bracket 100*i* are fixed to the artwork frame.

Figure 25:
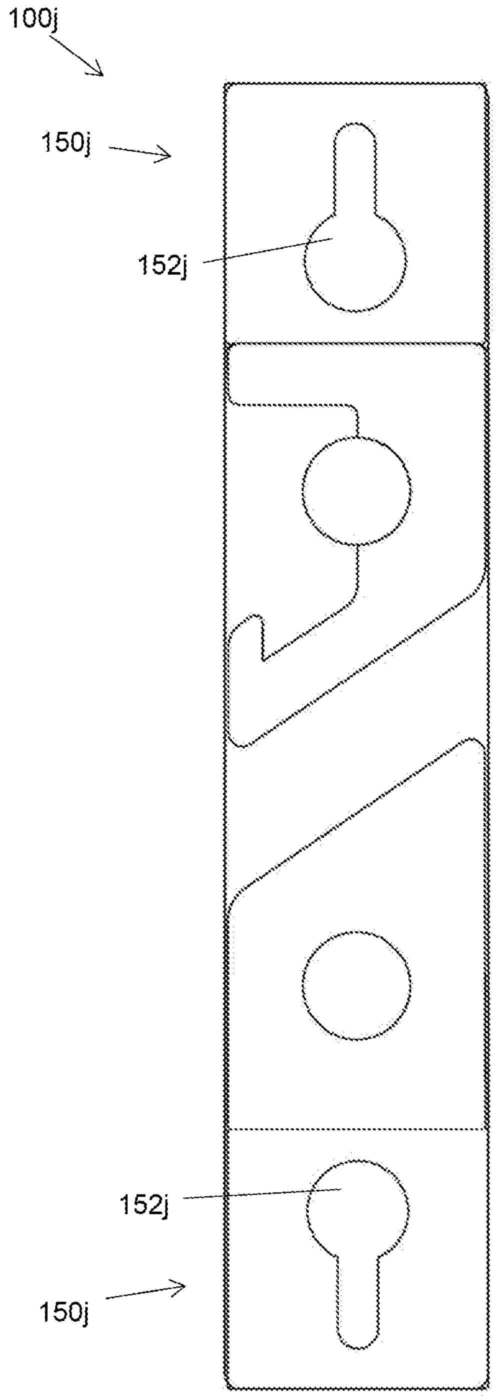
FIG. 25 illustrates a rear view of a keyhole bracket, according to an embodiment of the invention.
Figure 26:
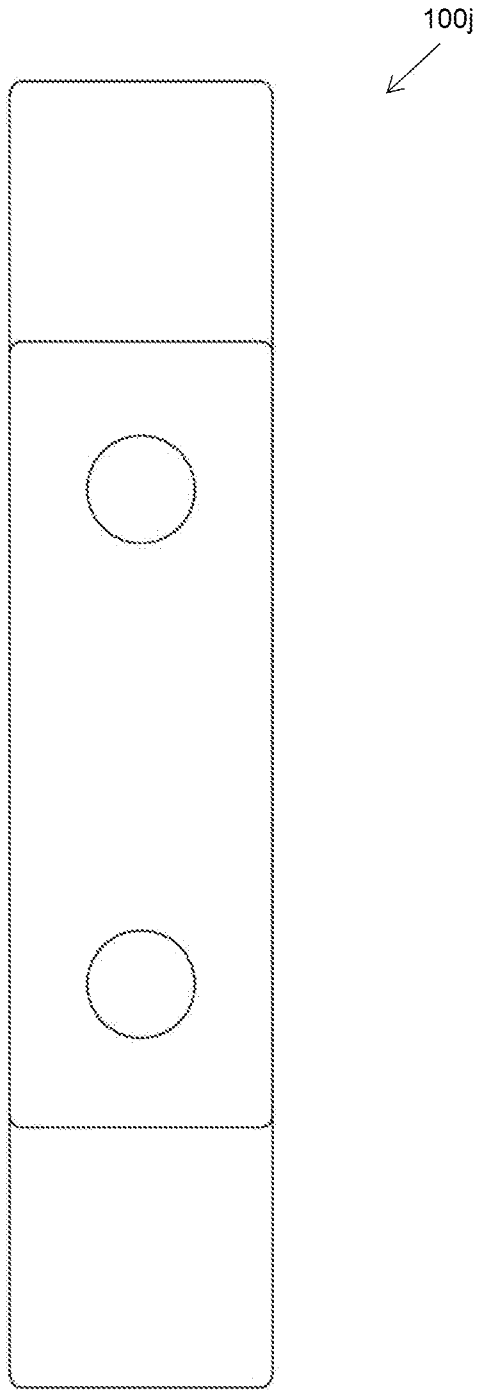
FIG. 26 illustrates a front view the keyhole bracket shown in FIG. 25.

FIGS. 25 and 26 illustrate a bracket 100*j* that provides an additional feature compared to bracket 100*a*. In particular, the bracket 100*j* includes a holding part 150*j*. The holding parts 150*j* are located on either end of the bracket 100*j* to allow it to be biorientable, on the right side of an artwork. The holding part 150*j* in this embodiment is in the form of a keyhole 152*j*. The keyhole 152*j* is configured to receive a pin with an enlarged end portion, as discussed further below.

Figure 27:
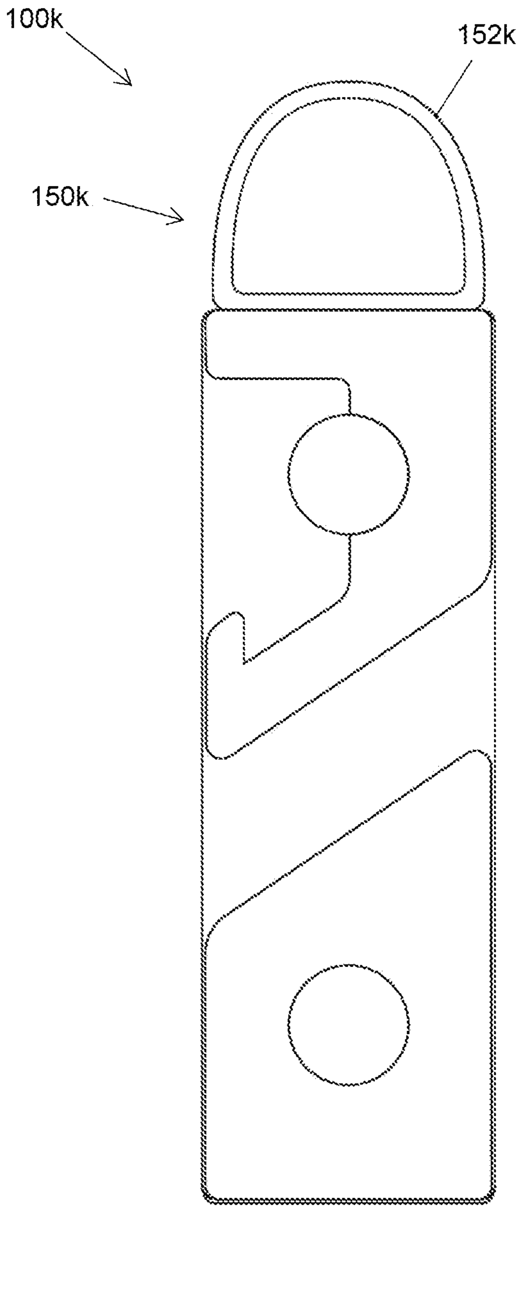
FIG. 27 illustrates a rear view of a hanging bracket, according to an embodiment of the invention.
Figure 28:
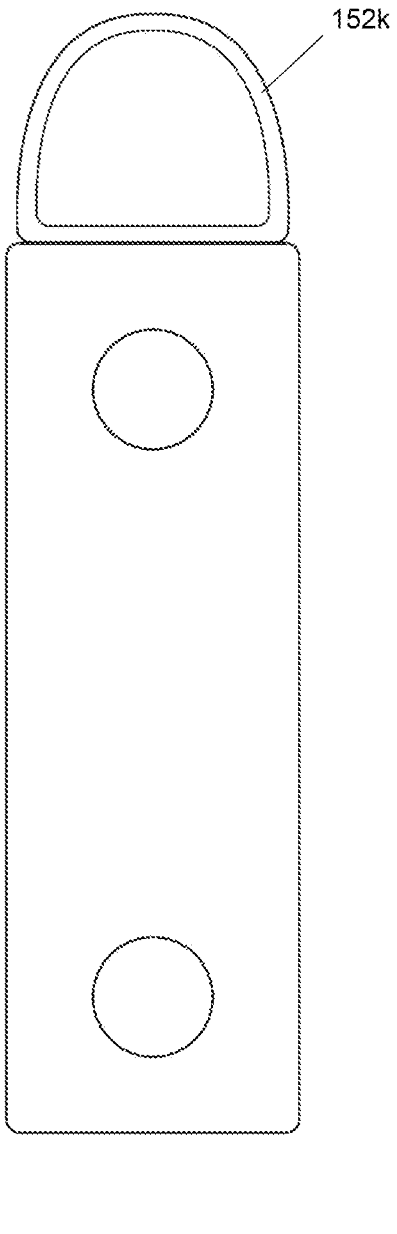
FIG. 28 illustrates a front view of the hanging bracket shown in FIG. 27.

FIGS. 27 and 28 illustrate another bracket 100*k* where the holding part 150*k* is in the form of a loop 152*k*. As will be appreciated by a person skilled in the art, the bracket 100*k* may be for the right side of an artwork but a further embodiment may be configured for the left side of the artwork.

Figure 29:
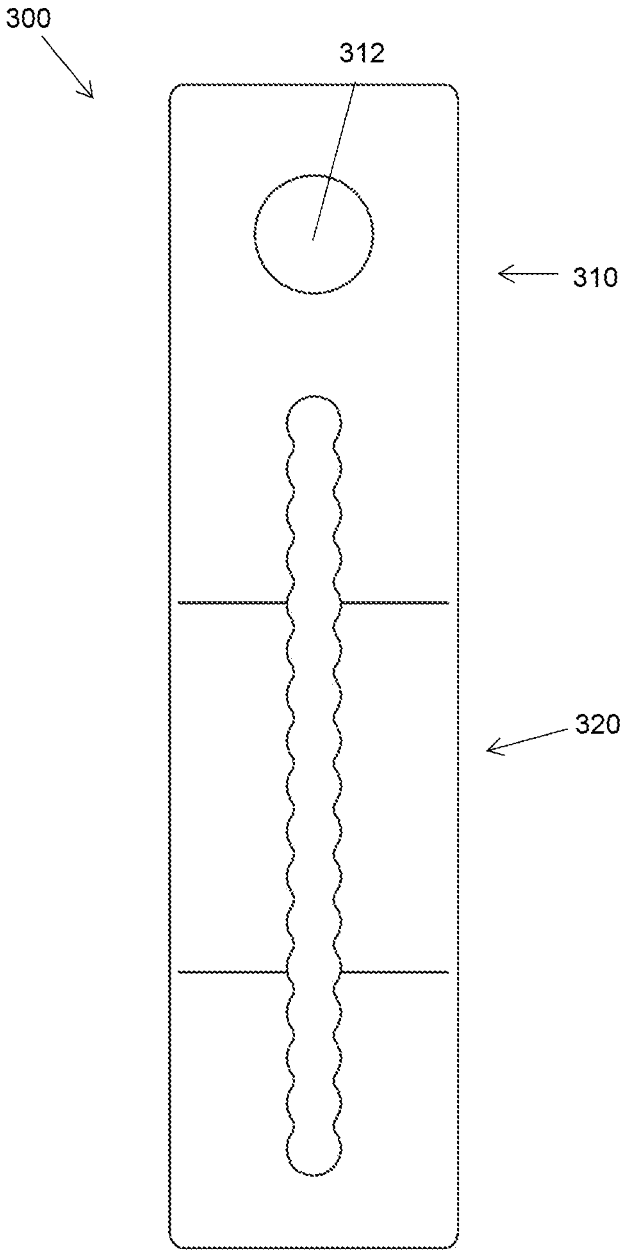
FIG. 29 illustrates a front view of an adjustable mount, according to embodiment of the invention.
Figure 30:
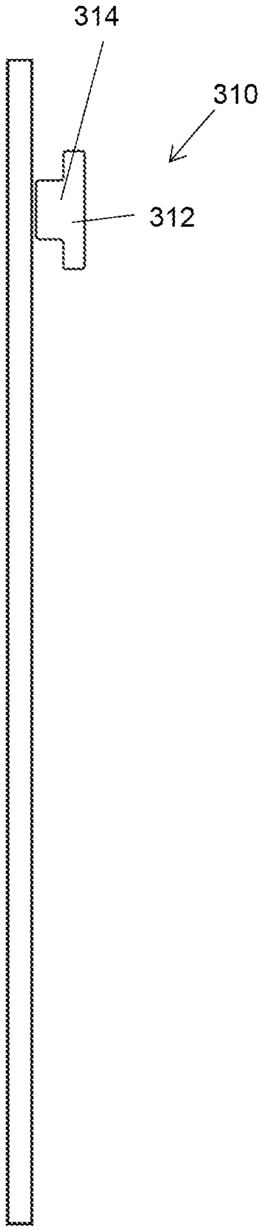
FIG. 30 illustrates a side view of the adjustable mount shown in FIG. 29.

To hang the holding parts 150 from a wall (for example), the mounting bracket 300, shown in FIGS. 29 and 30, may be used as part of the artwork handling system 10. The mounting bracket 300 includes a retaining portion 310. The retaining portion 310 includes an enlarged end portion 312 that assists retaining the holding parts 150. The end portion 312 is supported via a pin 314. The holding parts 150 may suitable engage with the retaining portion 310 to hang artworks.

The mounting bracket 300 also includes an adjusting portion 320 in the form of an indented hole. The adjusting portion 320 allows the position of the mounting bracket to be adjusted, relative to a fastener, when it is position on a wall. This adjustment assists in suitably hanging the artwork. Furthermore, this avoids having to drill multiple holes in a wall and, in comparison to drilling holes next to each other, the adjusting portion 320 provides finer increments of adjustment.

Figure 31:
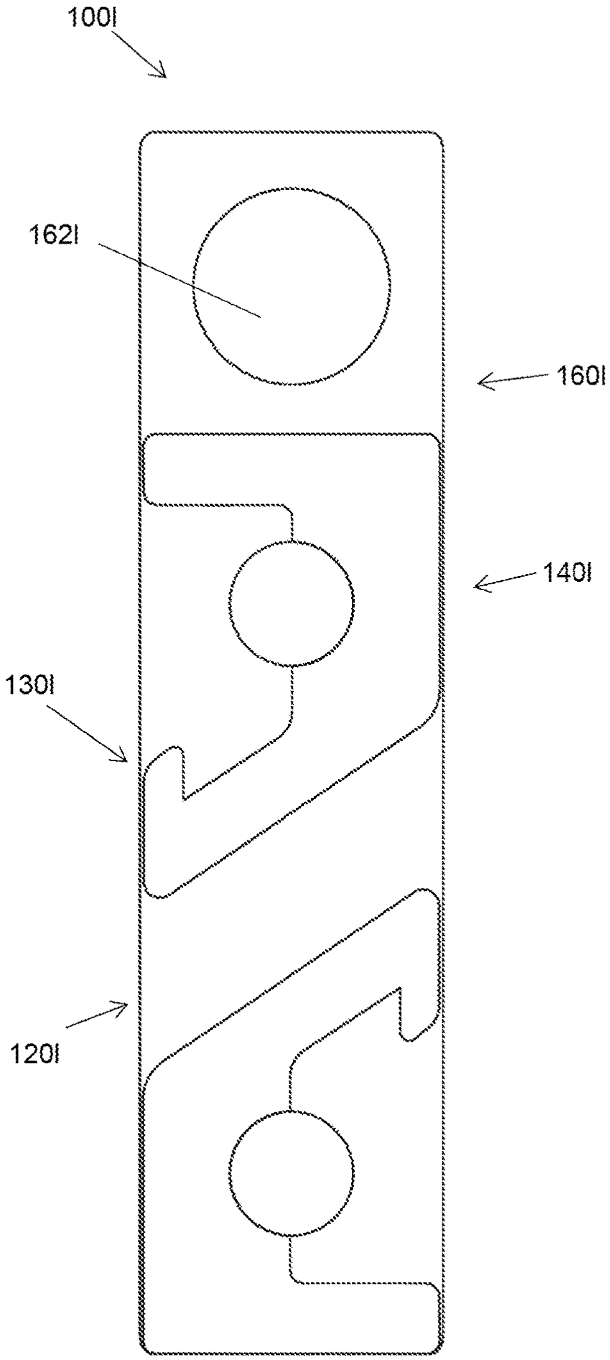
FIG. 31 illustrates a rear view of a mounting bracket, according to an embodiment of the invention.
Figure 32:
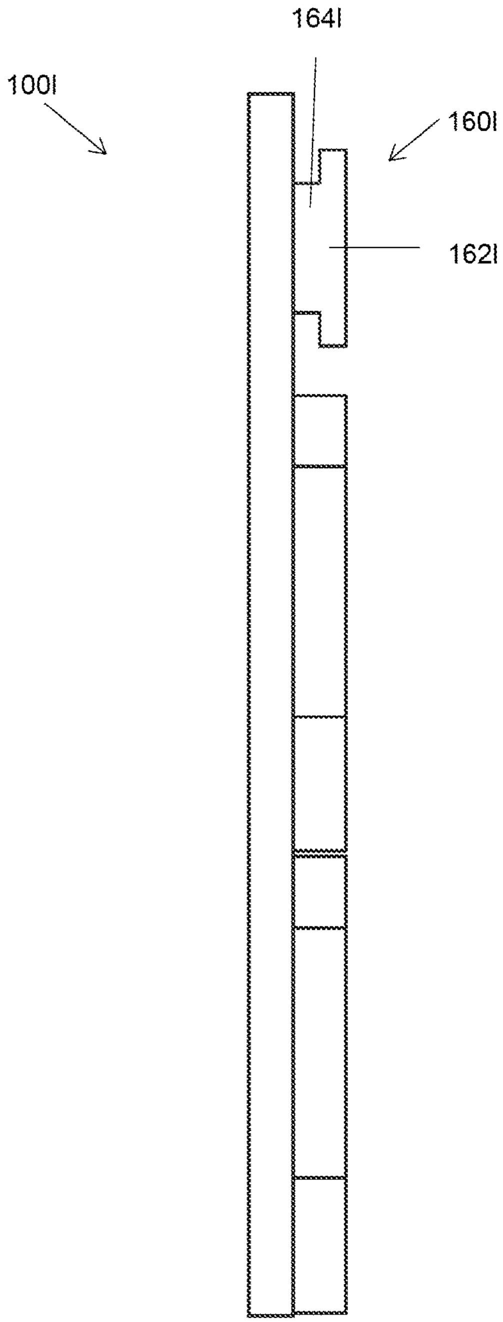
FIG. 32 illustrates a side view of the mounting bracket shown in FIG. 31.

FIGS. 31 and 32 illustrate a further bracket 100*l*. The further bracket 100*l* includes a number of features that are similar to bracket 100*a* (ie, aperture 120*l*, safety device 130*l*, attaching portion 140*l* etc.). However, the bracket 100*l* further includes a transport attachment 160*l*. The transport attachment 160*l* includes a retaining part 162*l* that is supported by supporting member 164*l*. The retaining part 162*l* is configured to interact with transporting fixture, as further outlined below.

Figure 33:
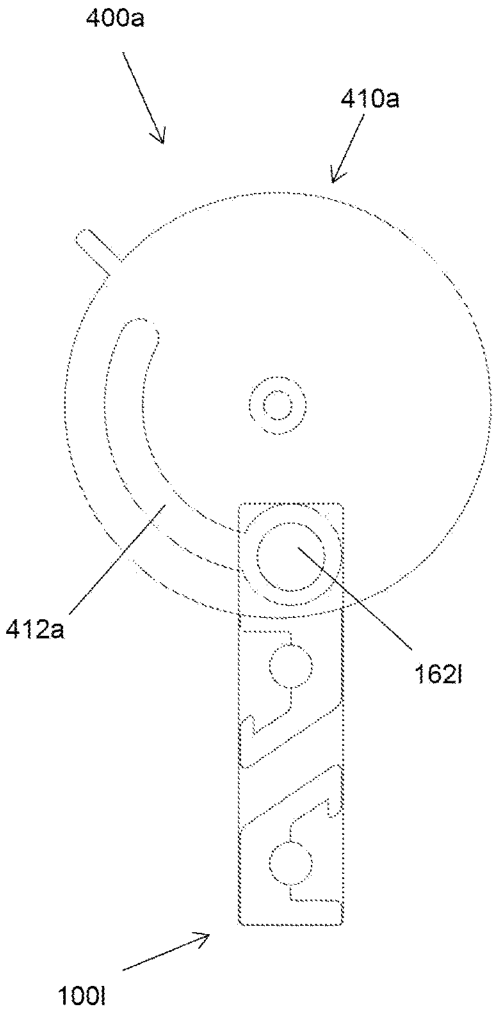
FIG. 33 illustrates the mounting bracket shown in FIG. 31 aligning with a transporting fixture, according to an embodiment of the invention.
Figure 34:
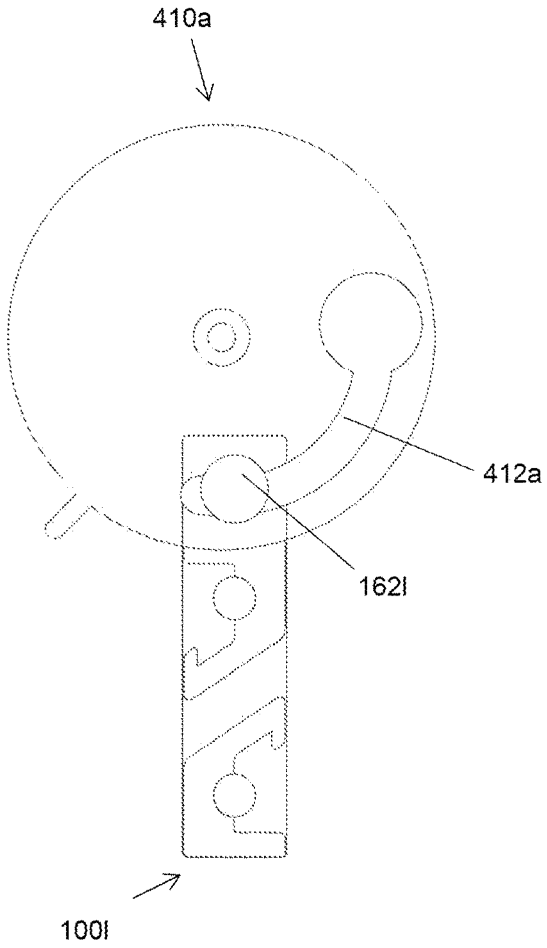
FIG. 34 illustrates the mounting bracket, shown in FIG. 31, in a locked position with the transporting fixture.

FIGS. 33 and 34 illustrate the retaining part 162 interacting with a transporting fixture 400*a*. The transporting fixture 400*a* is configured to be installed into a transporting container (not shown) and may form part of the artwork handling system 10. The transporting fixture 400*a* includes a plate 410*a* that is configured to rotate. The plate 410*a* includes a hole 412*a* in the form of a keyhole that extends radially around the plate 410*a*. The hole 412*a* is configured to receive the retaining part 162*l*, as shown in FIG. 33. To secure the artwork to the transporting container, the plate 410*a* rotates, trapping part of the hole 412*a* between the retaining part 162*l* and another part of the bracket 100*l* (as shown in FIG. 34). Following this, the artwork cannot be lifted from the transport container, securing it thereto. In order to release the artwork from the transport container, the plate 410*a* is rotated back to its initial position, shown in FIG. 33, where the retaining part 162*l* may be release from the plate 410*a*.

Figure 35:
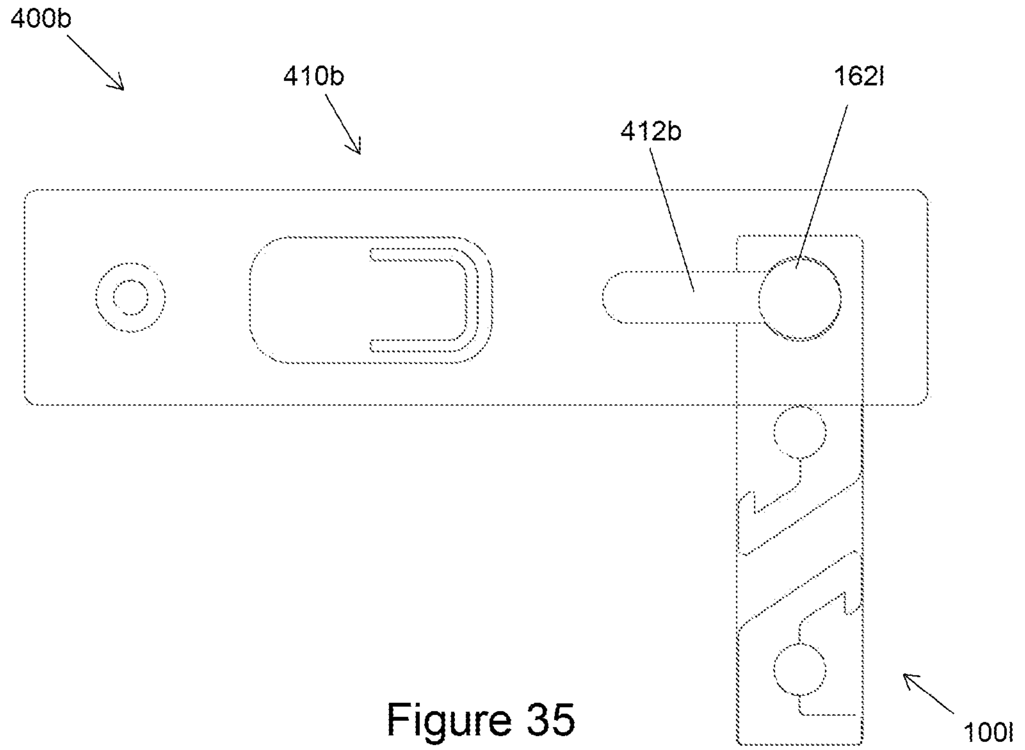
FIG. 35 illustrates the mounting bracket shown in FIG. 31 aligning with a linear transporting fixture, according to an embodiment of the invention.
Figure 36:
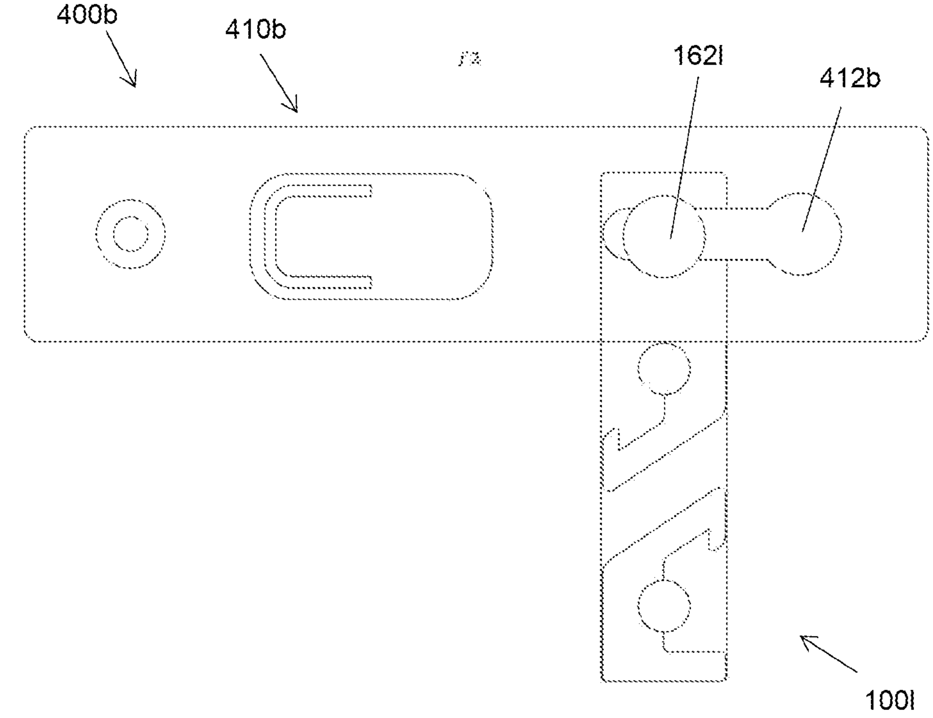
FIG. 36 illustrates the mounting bracket, shown in FIG. 31, in a locked position with the linear transporting fixture.

Another transporting fixture 400*b* is shown in FIGS. 35 and 36. The transporting fixture 400*b* includes a plate 410*b* that is substantially rectangular. The plate 410*b* includes a hole 412*b* that is in the form of a keyhole. The keyhole extends in a linear direction across the plate 410*b*. The transporting fixture 400*b* is configured to move from a first position, shown in FIG. 35, to a second position shown in FIG. 36. More specifically, the retaining part 162*l* of the bracket 100*l* is received into the larger section of the hole 412*b* in the first position (shown in FIG. 35). The plate 410*b* is the slid into the second position, shown in FIG. 36, to secure the bracket 100*l* (and artwork) to the transportation container. It will be appreciated that by locking the plate 410*b* between the retaining part 162*l*, and opposing face of the bracket 100*l*, the artwork is secured to the transportation container. To release the artwork from the container, the plate 410*b* is moved to the first position and then the artwork can be raised.

Figure 37:
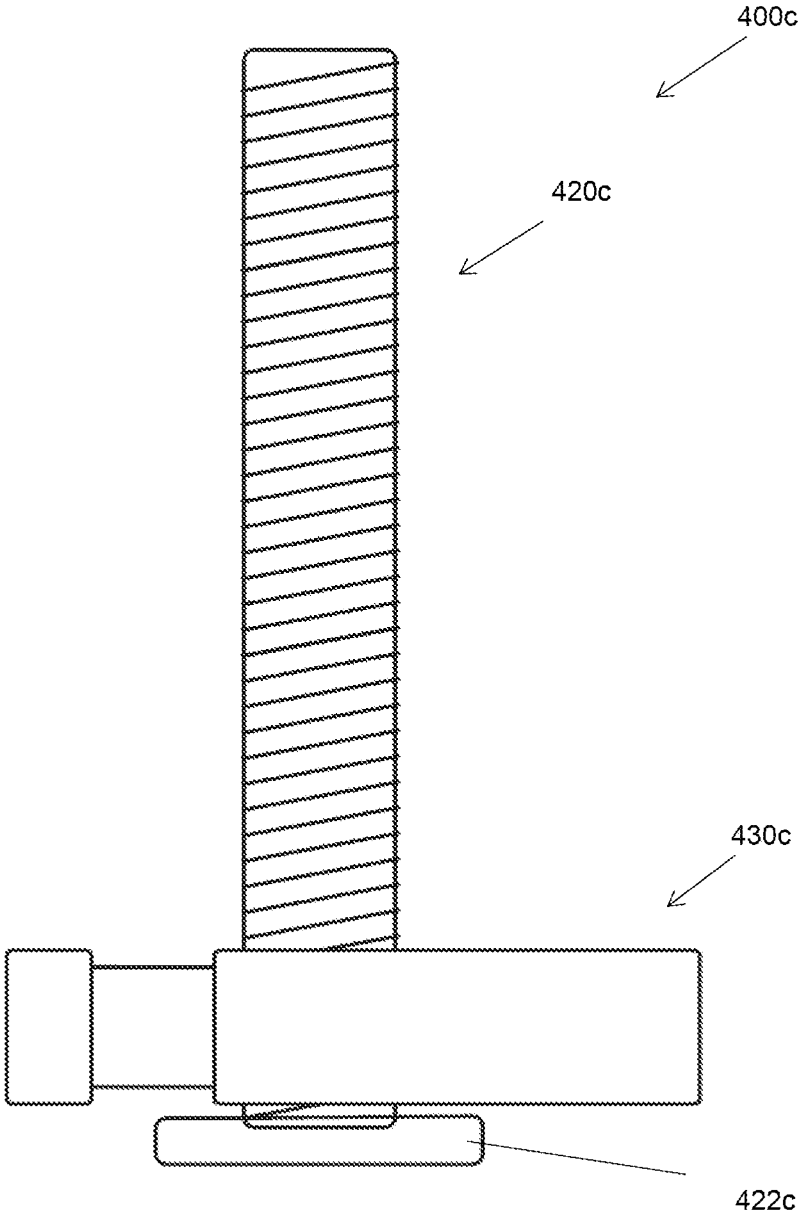
FIG. 37 illustrates a further transporting fixture, according to an embodiment of the invention.
Figure 38:
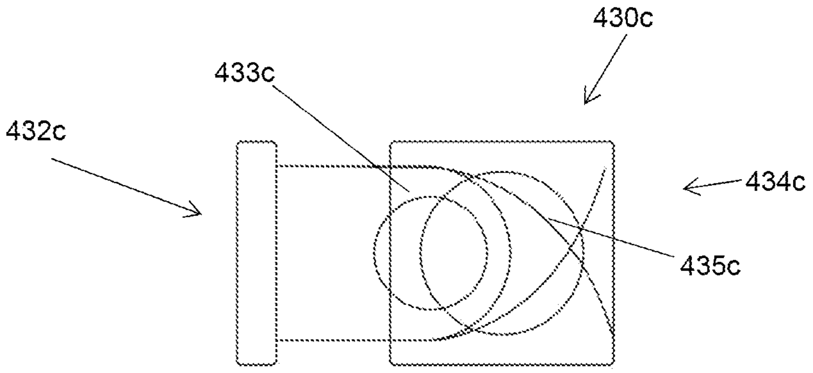
FIGS. 38 to 41 illustrate use of a retaining fastener, according to an embodiment of the invention.
Figure 39:
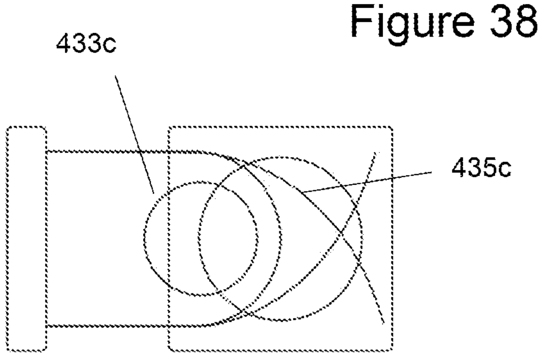

FIG. 37 illustrates a further transporting fixture 400*c*. The transporting fixture 400*c* includes an elongate member 420*c* in the form of a bolt. The elongate member includes a base portion 422*c* that is configured to be fixed to a transportation crate. The elongate member 420*c* is configured to the mounting portion 236*a* of the handling tool 200*a* thereover. This assists in installing the handling tool 200*a* in a transportation crate when it is engaged with the bracket 100*a* connected to the artwork. In particular, the mounting portion 236*a* is located adjacent the base portion 422*c*. Following this, a retaining fastener 430*c* is moved over the member 420*c* to retain the mounting portion between the fastener 430*c* and the base portion 422*c*.

Figure 40:
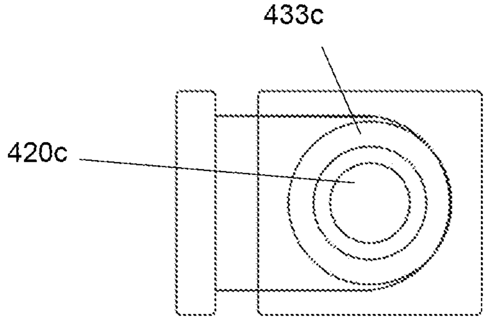
Figure 41:
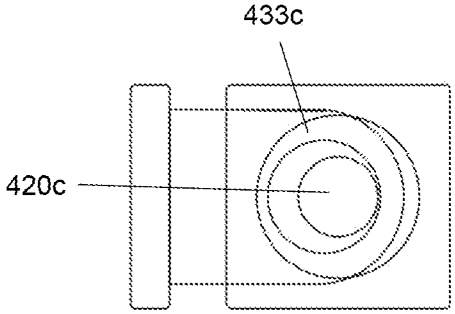

FIGS. 38 to 41 illustrate in further detail use of fastener 430*c*. In particular, the fastener 430*c* includes an inserting portion 432*c* and a biasing portion 434*c*. The inserting portion 432*c* includes a hole 433*c*. The biasing portion 434*c* includes a spring 435*c*. In response to inserting the inserting portion 432*c* into a position that aligns with a hole in the biasing portion 434*c*, the fastener 430*c* may be moved over the member 420*c* (as shown in FIG. 40). When the fastener 430*c* is moved to a suitable position to retain the mounting portion 236*a*, pressure on the inserting portion 432*c* may be released, and the spring 435*a* will bias the inserting portion 432*c* against the member 420*c*. This prevents the fastener 430*c* from further movement, until the inserting portion 432*c* is reengaged, allowing the fastener 430*c* to fix the mounting portion 236*a* in place.

Figure 42:
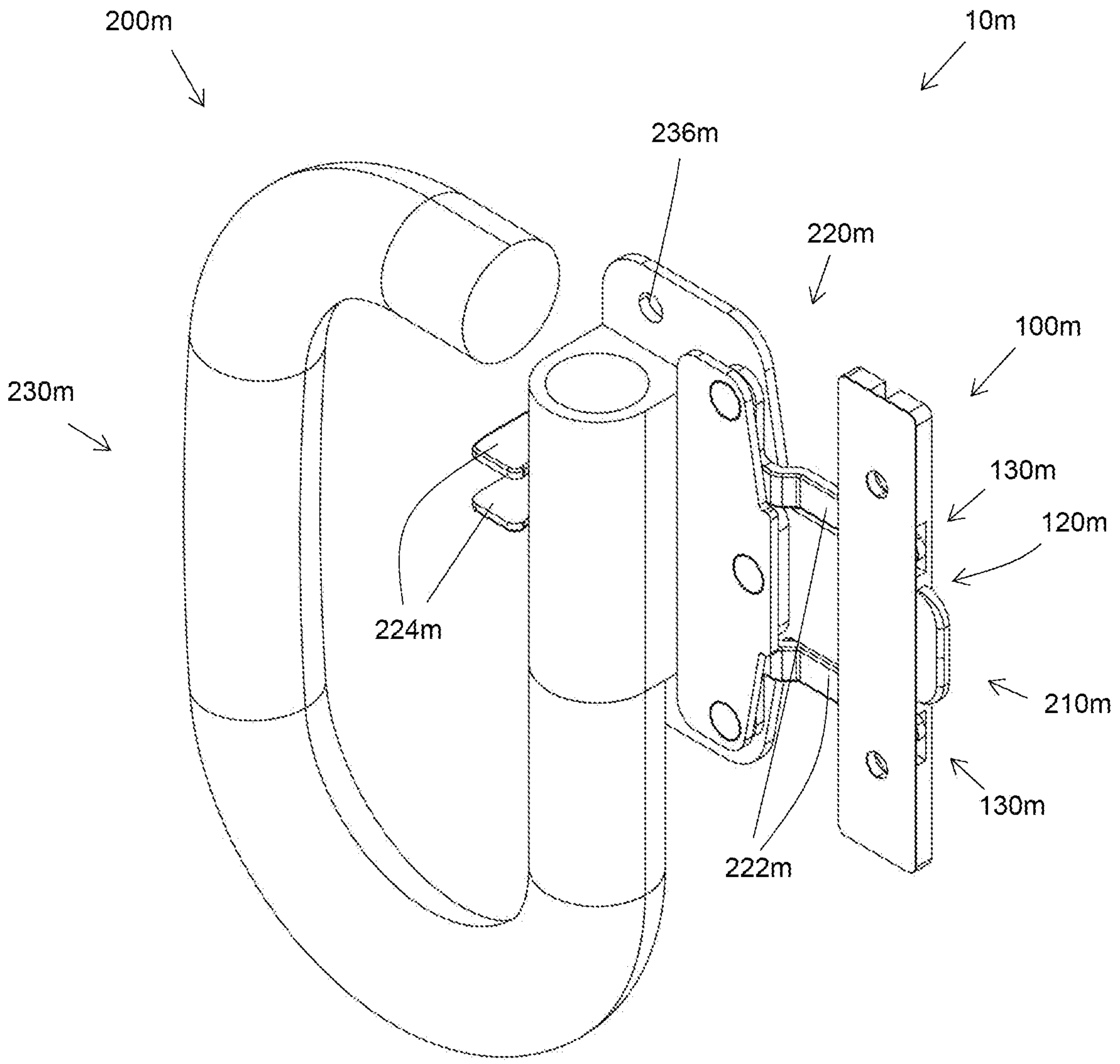
FIG. 42 illustrates a perspective view of a further artwork handling system, according to an embodiment of the invention.
Figure 43:
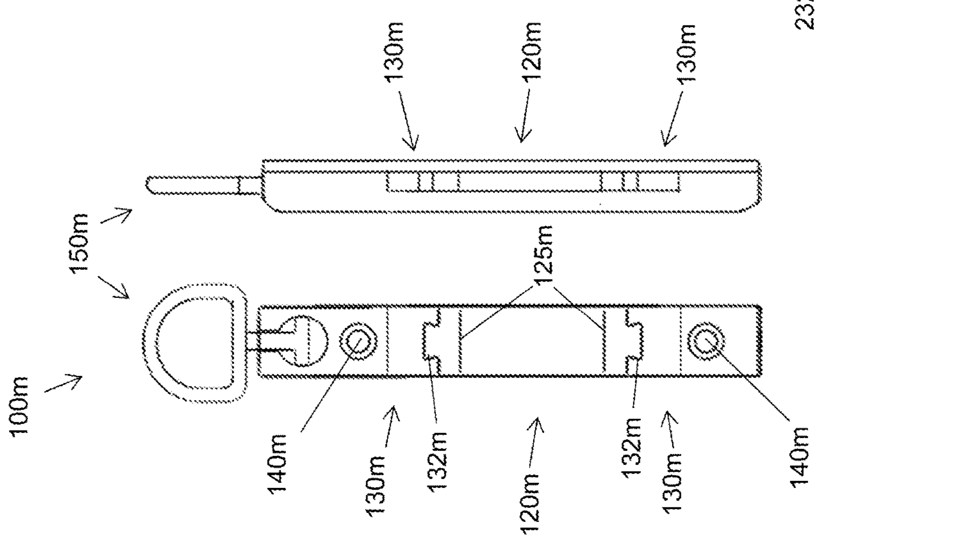
FIG. 43 illustrates a sectional view and a separate side view of a bracket shown in FIG. 42.

FIG. 42 illustrates a further artwork handling system 10*m*. The artwork handling system 10*m* includes a bracket 100*m* and a handling tool 200*m*. The bracket 100*m* is further shown in FIG. 43 where a sectional view is illustrated on the left and a side view is illustrated on the right. The bracket 100*m* includes an aperture 120*m*. The aperture 120*m* extends in a straight direction across the bracket 100*m*. That is, the side walls 125*m* extend perpendicularly to the outer longitudinal sides of the bracket 100*m*. As further outlined below, this allows the bracket 100*m* to be located and used on any side of the artwork (eg, the top, bottom and lateral sides). In other words, different brackets are not required for each side—the bracket 100*m* can be suitably used on any side of the artwork (bearing in mind the holding part 150*m* may or may not be required depending on its position). As further detailed below, the bracket 100*m* being located on any side also assists with transporting the artwork and, if required, resting the artwork on a ground surface during, for instance, installation.

The bracket 100*m* includes two safety devices 130*m*. Having two safety devices 130*m*, either side of the middle portion of the bracket 100*m*, assists in allowing the bracket to be used on any side of the artwork. The safety devices 130*m* include a safety catch 132*m*. The safety catch 132*m* in this embodiment includes a protrusion extending into an opening.

The bracket 100*m* also includes attaching portions 140*m* that assist with connecting the bracket to the artwork. The attaching portions 140*m* each form a hole. The holding parts 150*m* also assist with connecting the artwork to, for example, a wall. The holding parts 150*m* include a D-shape part in this embodiment.

Figure 45:
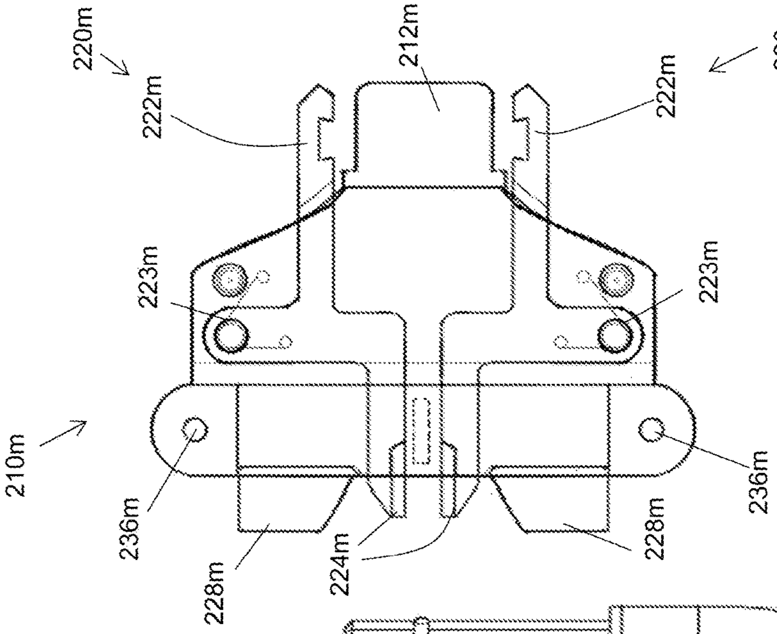
FIG. 45 illustrates a top sectional view of an engaging portion shown in FIG. 42.
Figure 46:
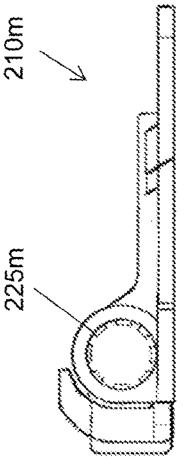
FIG. 46 illustrates a side sectional view of the engaging portion shown in FIG. 42.
Figure 44:
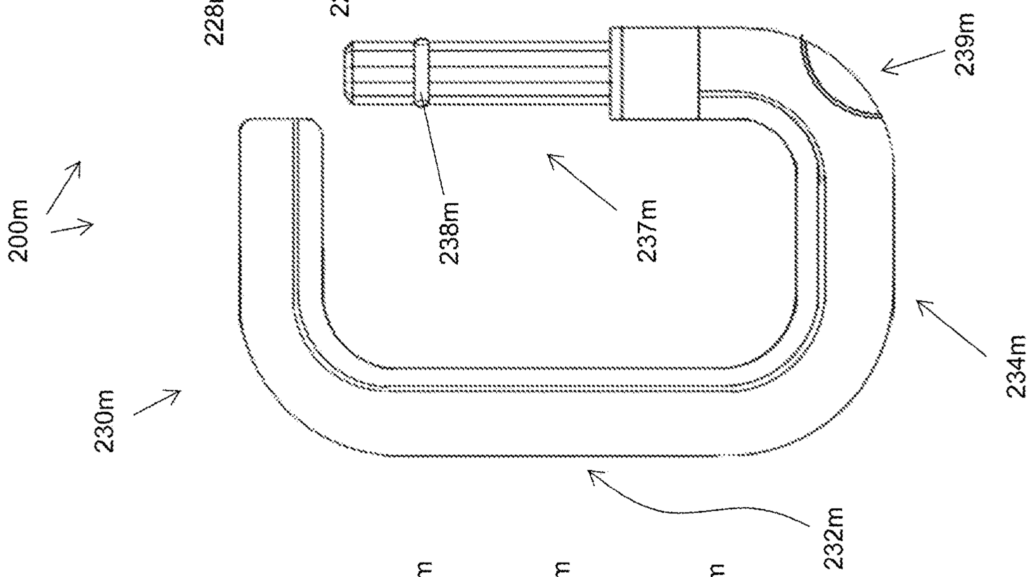
FIG. 44 illustrates a front view of a holding portion shown in FIG. 42.

The handling tool 200*m* is shown further in FIGS. 44 to 46. The handling tool 200*m* includes an engaging portion 210*m* and a holding portion 230*m*. The engaging portion 210*m* is releasably connected to the holding portion 230*m*. The engaging portion 210*m* is shown further in FIGS. 45 and 46. The engaging portion 210*m* includes a member 212*m* that is configured to engage with aperture 120*m* to assist with holding the artwork. The member 212*m* is substantially rectangular.

The handling tool 200*m* includes two safety mechanisms 220*m*. The safety mechanisms 220*m* each include a safety latch 222*m*. The safety latches 222*m* are located either side of the member 212*m*. The member 212*m* is therefore located centrally between the safety latches 222*m*. The safety mechanisms 220*m* pivot about a point. To one side of the point is the safety latches 222*m* that are configured to respectively engage the safety catches 132*m* (to avoid inadvertent disengagement of the handling tool 200*m* form the bracket 100*m*). To another side of the point is a safety release 224*m*. The safety release 224*m* forms two tabs. The safety mechanisms 220*m* pivot in a plane that is substantially parallel with a front surface of the artwork.

The pivot points of the safety mechanisms 220*m* are biased by a spring member 223*m*. The spring member 223*m* biases the safety latches 222*m* towards one another. In response to the safety latches 222*m* moving through the safety devices 130*m*, the safety latches 222*m* are configured to rotate over the safety catches 132*m* and then pivot (back) to a position locking them in place with the safety catches 132*m*. To release the safety latches 222*m*, the tabs of the safety release 224*m* are moved towards each other, allowing the safety latches 222*m* to move to a position where they suitably disengage from the safety catches 132*m* and are able to be removed from the safety devices 130*m*.

The engaging portion 210*m* includes mounting portions 236*m* that may assist, for instance, during transportation. The mounting portions 236*m* form two holes either side of the member 212*m*. The engaging portion 210*m* also includes a positioning part 225*m*. As detailed further below, the positioning part 225*m* is configured to receive the holding portion 230*m* at a predetermined orientation. The positioning part 225*m* includes an opening. The opening includes a plurality of splines. The positioning part 225*m* also includes a locking portion. The holding portion 230*m* may be released before transportation to facilitate packaging requirements. In addition, the engaging portion 210*m* includes one or more base portions 228*m*. The base portions 228*m* can be used as feet in, for example, staging the artwork or resting the artwork during installation. The base portions 228*m* may include rubber (to act as rubber feet).

As shown in FIG. 44, the holding portion 230*m* includes a gripping portion 232*m* and a base portion 234*m*. A key aspect of the holding portion 230*m* is the position portion 237*m*. The positioning portion 237*m* includes a plurality of splines. The positioning portion 237*m* is configured to engage with the positioning part 225*m*. The interaction of the splines assist in setting a relative angle between the engaging portion 210*m* and the holding portion 230*m*. That is, various angles between the engaging portion 210*m* and the holding portion 230*m* portion may be set at predetermined angles. This allows the holding portion 230*m* to be used on any side of the artwork and facilitates ambidextrous operation. This also assists ensuring the holding portion 230*m* can be positioned to avoid contact with the artwork (sides or face), especially in instances where the artwork may be of a significant depth (eg, setting the holding portion 230*m* on an angle set outward from the artwork ensures the gripping portion 232*m* can be grasped without a user's hand coming into contact with the artwork). Further, if required, the holding portion 230*m* can be set in an upright position (perpendicular to the bracket aperture 120*m*) during transport, where the crate clearance around the artwork is insufficient to allow for their retention at an outward angle. In addition, the shape of the gripping portion 232*m*, whereby it includes an upper, lower and side gripping part facilitates holding the gripping portion 232*m* in the various positions around the different sides of the artwork.

In order to avoid the holding portion 230*m* from inadvertently releasing from the engaging portion 210*m*, the holding portion 230*m* also includes a positioning lock 238*m*. The positioning lock 238*m* includes a ball release mechanism. A ball engages with the locking portion in the positioning part 225*m* when the positioning portion 237*m* reaches a certain location in the positioning part 225*m*. In order to release positioning lock 238*m*, the position release 239*m* is pushed. This retracts the ball and allows the holding portion 230*m* to be removed from the engaging portion 210*m*.

Figure 47:
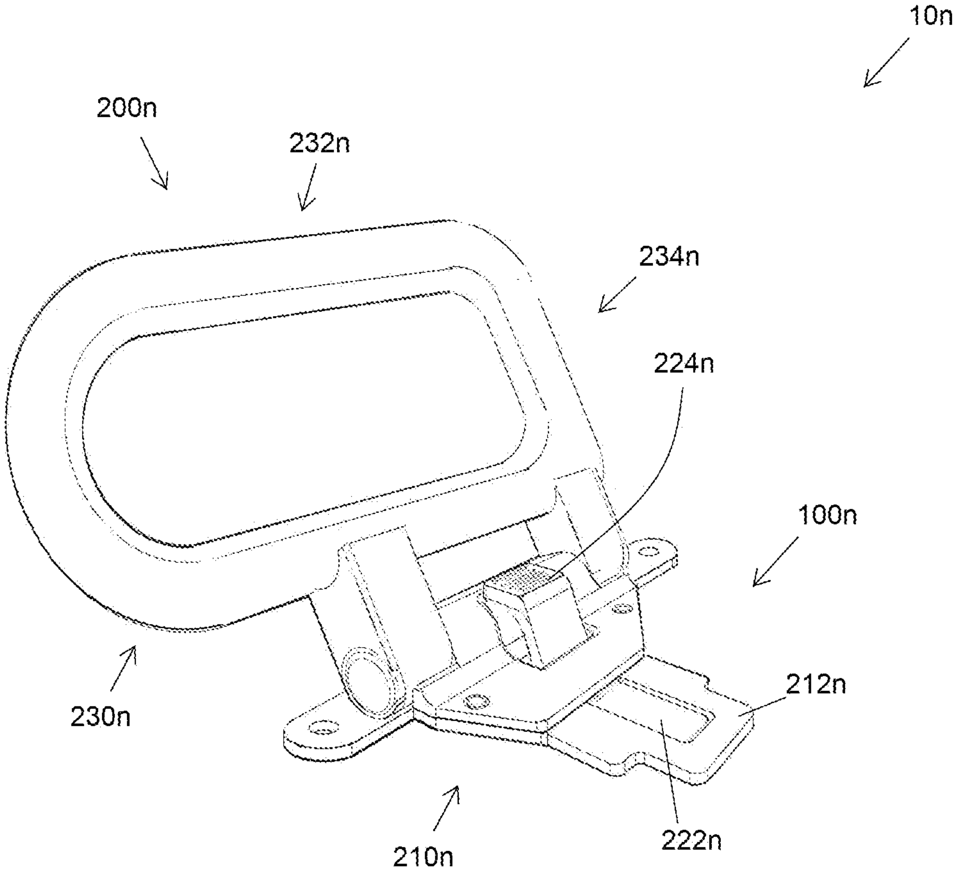
FIG. 47 illustrates a perspective view of an additional artwork handling system, according to an embodiment of the invention.

FIG. 47 illustrates an additional artwork handling system 10*n*. The artwork handling system 10*n* includes a bracket 100*n* and a handling tool 200*n*. The bracket 100*n* is further shown in FIG. 48 where a sectional view is illustrated on the left and a top view is illustrated on the right. The bracket 100*n* includes an aperture 120*n*. The aperture 120*n* extends in a straight, lateral direction across the bracket 100*n*. The aperture 120*n* includes side walls 125*n* and transverse walls 126*n*. One of the transverse walls 126*n* includes a safety device 130*n*. The safety device 130*n* is therefore in communication with part of the aperture 120*n* in this embodiment. The safety device 130*n* is substantially in the form of a (square) hole. With the aperture 120*n* and safety device 130*n* in mind, this allows the bracket 100*n* to be located and used on any side of the artwork. The holding part 150*n* also assists in holding the artwork.

Figures 48, 49, 50, 51:
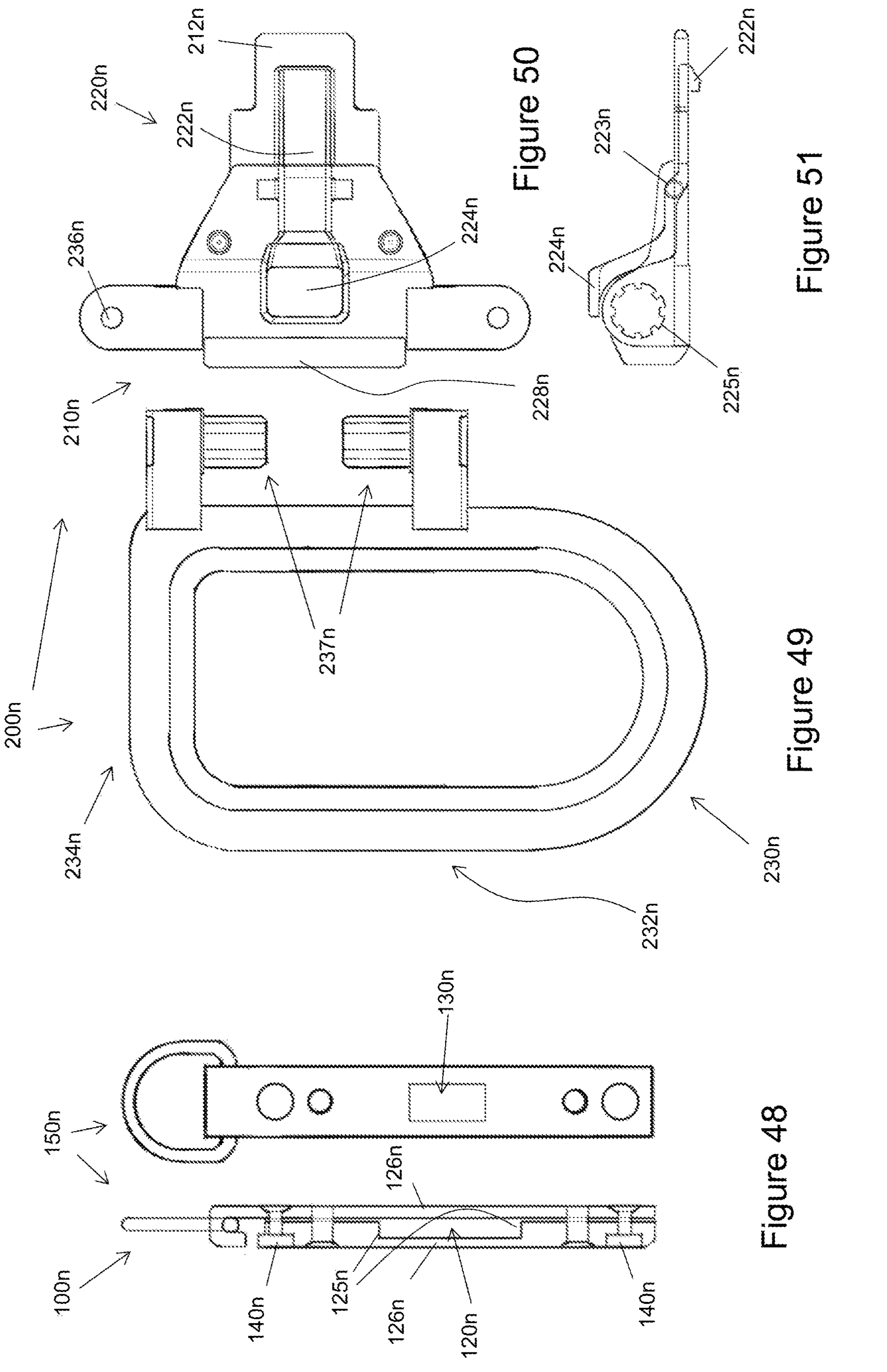
FIG. 48 illustrates a sectional view and a separate top view of a bracket shown in FIG. 47.
FIG. 49 illustrates a front view of a holding portion shown in FIG. 47.
FIG. 50 illustrates a top sectional view of an engaging portion shown in FIG. 47.
FIG. 51 illustrates a side sectional view of the engaging portion shown in FIG. 47.

The handling tool 200*n* is shown further in FIGS. 49 to 51. Similar to the handling tool 200*m*, the handling tool 200*n* includes an engaging portion 210*n* and a holding portion 230*n*. The engaging portion 210*n* is releasably connected to the holding portion 230*n*. The engaging portion 210*n* is shown further in FIGS. 50 and 51. The engaging portion 210*n* includes a member 212*n* that is configured to engage with aperture 120*n* to assist with holding the artwork. The member 212*n* is substantially planar and forms a rectangle.

The handling tool 200*n* includes safety mechanism 220*n*. The safety mechanism 220*n* extends along a central axis of the member 212*n*. The safety mechanism 220*n* pivots about a point. The point is biased by a spring 223*n*. This results in a safety latch 222*n* being located to one side of the pivot and a safety release 224*n* being located to another side of the pivot. The safety latch 222*n* includes a protrusion that is configured to extend beyond a face of the member 212*n*. In this regard, as the member 212*n* is inserted into the aperture 120*n*, the safety mechanism 220*n* will rotate in a first direction to allow the member 212*n* to be inserted into the aperture 120*n*. In response to the safety latch 222*n* moving across the safety device 130*n*, the safety latch 222*n* will rotate in a second direction such that the safety latch 222*n* latches with the safety device 130*n*. The spring 223*n* assists in rotating the safety latch 222*n* into the safety device 130*n* (as evident in FIG. 51).

When the safety latch 222*n* is engaged with the safety device 130*n*, this prevents the member 212*n* inadvertently disengaging from the aperture 120*n*. When releasing the member 212*n* is required, the safety release 224*n* is pressed. This in turn will rotate the safety latch 222*n* to a position where the member 212*n* may be removed from the aperture 120*n* without the latch 222*n* substantially interfering.

The engaging portion 210*n* includes mounting portions 236*n* that may assist, for example, during transportation. The mounting portions 236*n* form two holes either side of the member 212*n*. The holding portion 230*n* is typically released during transportation. The engaging portion 210*n* also includes a portion 228*n*. The base portion 228*n* can be used as a foot in, for example, staging the artwork or resting the artwork during installation. The base portion 228*n* may include an elastic material (such as rubber). In addition, the engaging portion 210*n* includes a positioning part 225*n*. The positioning part 225*n* includes two openings. The openings include a plurality of splines. As outlined further below, the positioning part 225*n* is configured to receive the holding portion 230*m* at one or more predetermined orientations.

As shown in FIG. 49, the holding portion 230*n* includes a gripping portion 232*n* and a base portion 234*n*. A key aspect of the holding portion 230*n* is the position portions 237*n*. The positioning portions 237*m* include a plurality of splines. The positioning portions 237*n* are respectively configured to engage with the positioning part 225*m* from one end. The interaction of the splines, at either end, assist in setting a relative angle between the engaging portion 210*n* and the holding portion 230*n*. This allows the holding portion 230*n* to be used on any side of the artwork and facilitates ambidextrous operation (along with the other advantages mentioned with regard to holding portion 230*m*). The positioning portions 237*n* take the form of captive plugs that can move in order to suitably engage the positioning part 225*n*. In further embodiment, the positioning portions 237*n* may form push-to-engage/push-to-release plugs.

Figure 52:
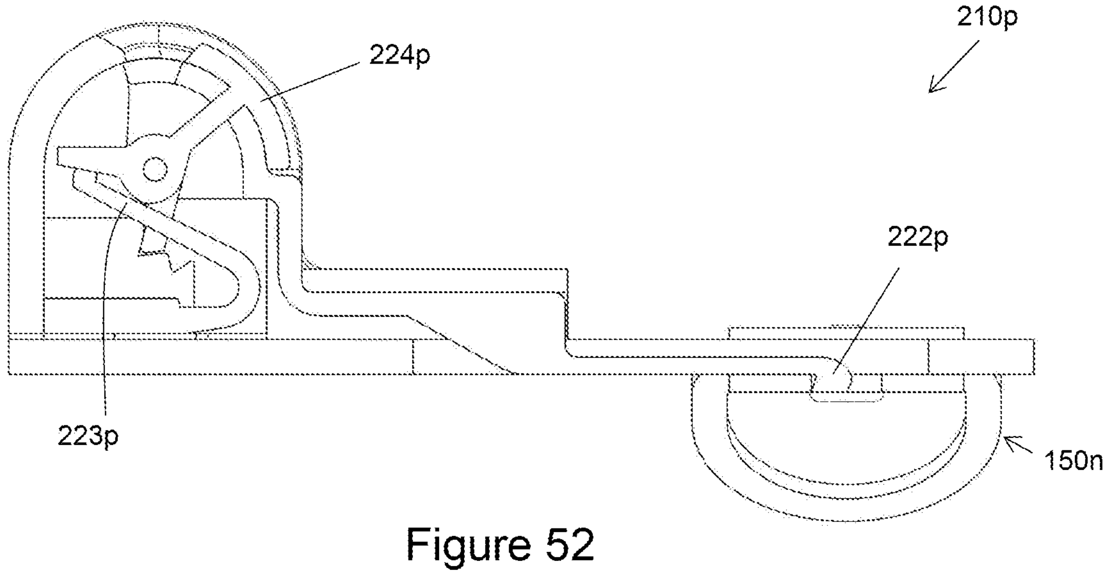
FIGS. 52 to 54 illustrate a sectional view of a safety mechanism, during use, according to a further embodiment of the invention.
Figure 53:
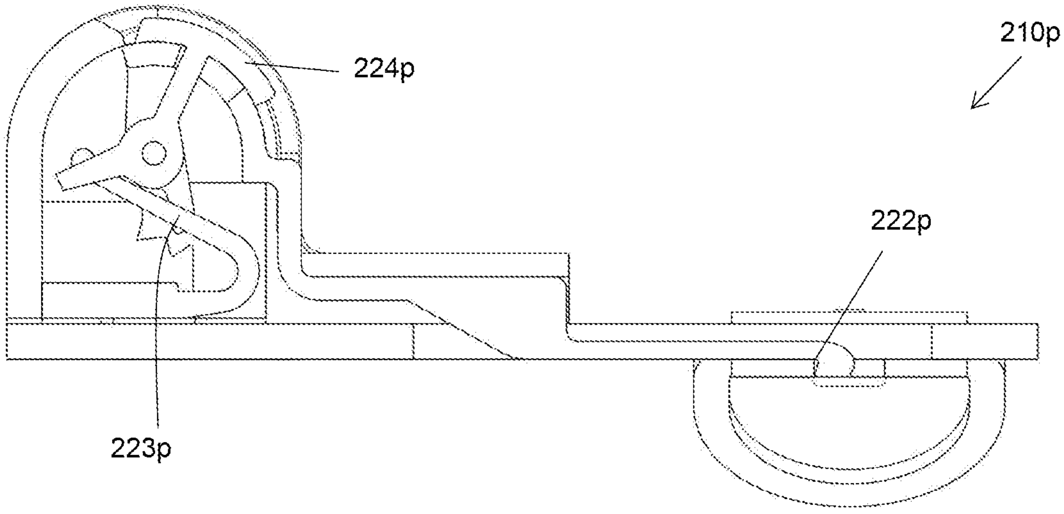
Figure 54:
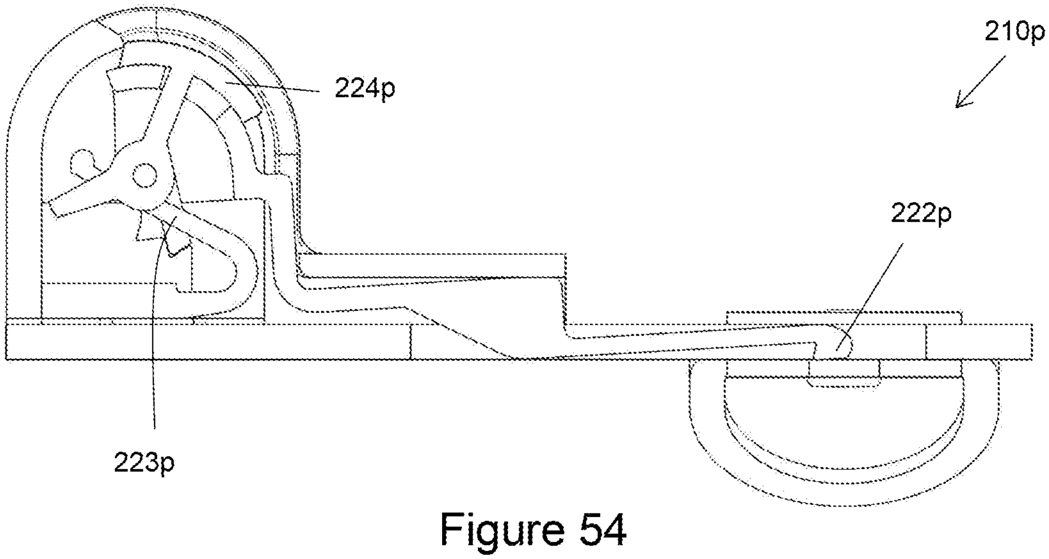

FIGS. 52 to 54 illustrate a further engaging portion 210*p*. The engaging portion 210*p* may be used with, for instance, the bracket 100*n* and the holding portion 230*n*. In comparison to the engaging portion 210*n*, the engaging portion 210*p* includes a differently arranged safety latch 222*p*, spring 223*p* and safety release 224*p*.

FIG. 52 illustrates the engaging portion 210*p* in a latched position. The spring 223*p* holds the safety latch 222*p* in a locked position. Pressing on the safety release 224*p* in this position does not result in any movement of the safety latch 222*p* due to the position of it outer legs. In FIG. 53, the safety release 224*p* is rotated to an unlatched position. If pressure is released from the safety release 224*p* at this point, the spring 223*p* will return the safety release 224*p* to the latched position shown in FIG. 53. In order to disengage the safety latch 222*p* (as shown in FIG. 54), force is applied onto the safety release 224*p* towards the spring 223*p*. This results in the safety latch 222*p* disengaging from, for example, the safety device 130*m*. When the force is released from the safety release 224, the spring 223*p* returns the safety release 224*p* to its initial position and allows the safety latch 222*p* returns to its position shown in FIG. 52.

FIGS. 55 to 58 illustrates a further engagement portion 210*q*. The engagement portion 210*q* may be used with, for example, the holding portion 230*m* and bracket 100*q*. The engagement portion 210*q* includes two members 212*q* that are configured to engage with aperture 120*q* of bracket 100*q*. The members 212*q* assist with holding the artwork. The members 212*q* include the safety latches 222*q* in this embodiment (or vice versa). The members 212*q* are biased away from one another by spring 223*q*.

Figure 55:
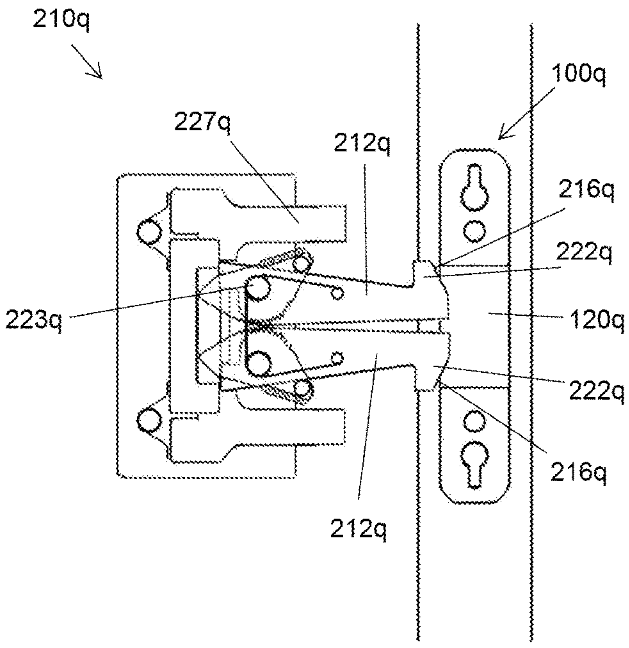
FIGS. 55 to 58 illustrate a sectional view of an engaging portion, during use, according to a further embodiment of the invention.
Figure 56:
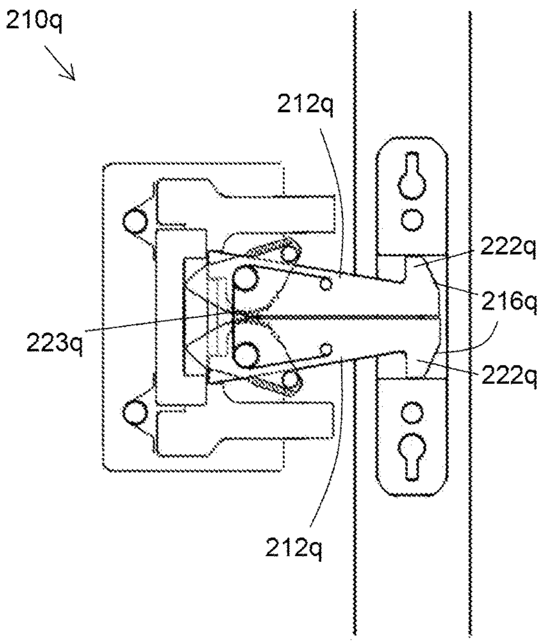
Figure 57:
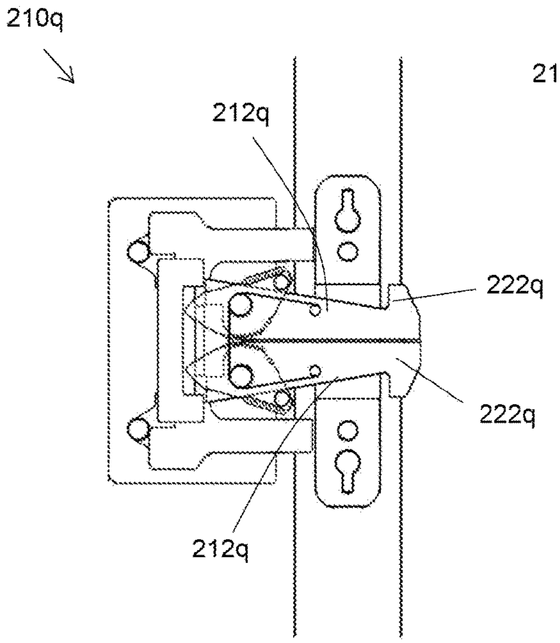
Figure 58:
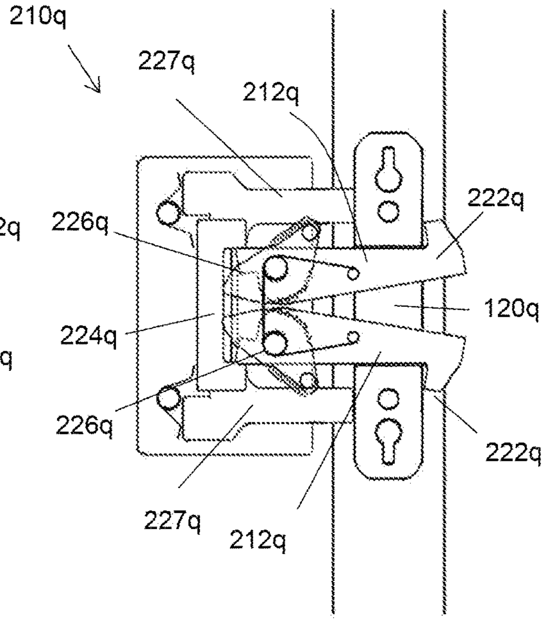

As shown in FIGS. 55 and 56, as taper 216*q* engages with the aperture 120*q*, the members 212*q* are forced towards each other. This allows the members 212*q*, together with the safety latches 222*q*, to pass through the aperture 120*q*. The stopping member 227*q* initially prevents the member 212*q* from moving apart through an upstanding member. As shown in FIGS. 57 and 58, as the safety latches 222*q* pass the aperture 120*q*, they are able to rotate and lock behind a portion of the bracket 100*q*. This occurs when the stopping portion 227*q* interacts with the bracket 100*q* and is forced backwards, allowing the safety latches 222*q* to open in the manner shown in FIG. 58. In this position, the members 212*q* firmly engage with the side walls of the aperture 120*q* and the artwork may be lifted.

In response to having to remove the members 212*q*, a safety release 224*q* is moved in a direction away from the members 212*q*. Following this, crank portions 226*q* can be rotated inwards. As a result of the crank portions 226*q* rotating inwards, the safety latches 222*q* rotate inwards. This allows the safety latches 222*q* to be retracted through the aperture 120*q* in order to remove the members 212*q*.

Figure 59:
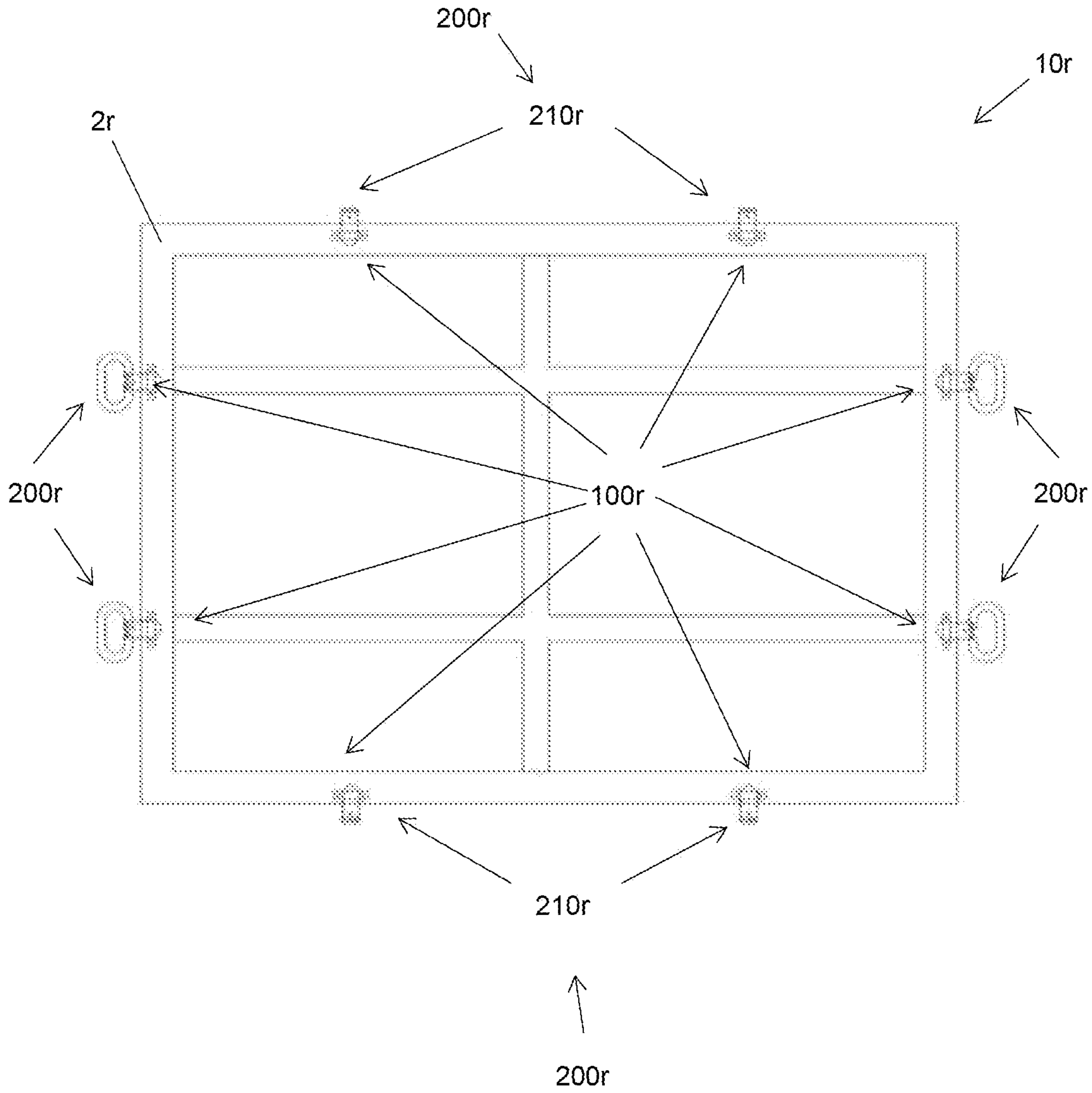
FIG. 59 illustrates an artwork frame using an artwork handling system, according to an embodiment of the invention.

FIG. 59 illustrates an artwork system 10*r* in use with an artwork frame 2*r*. The artwork system 10*r* includes brackets 100*r* and handling tools 200*r*. The brackets 100*r* and handling tools 200*r* can be substantially the same as any one of brackets 100*a-q* and tools 200*a-q*. The brackets 100*r* are connected to a rear surface of the frame 2*r*. The opposite (front) surface of the frame 2*r* includes the artwork area. As evident in FIG. 59, the brackets 100*r* are located in a position such that the handling tools 200*r* can access the brackets 100*r* from a side of the artwork. The engaging portion 210*r*, along the lower and upper side, are shown as footings/transport attachments but can also include a holding portion for carrying the artwork.

As outlined above, the artwork handling system 10 provides a number of advantages including:

i) a methodology and means by which artworks can be installed, packed and transported without any contact whatsoever with the critical areas of the artwork (eg, the front surface displaying the artwork and the sides of the artwork). This avoids the irreparable damage and destruction of artworks often caused during handling, including: a) cracks, indents or abrasions in the artworks surface caused by fingers, knuckles or palms of art handlers pressing against the artwork surface; b) dirt or oils transferred to the artwork by unclean or incorrect handling gloves; c) accretions or abrasions caused by handlers bodies coming into contact with artwork surfaces (particularly for larger artworks/base grip positions); and d) abrasions and wear during transit caused by packing materials in contact with artwork surfaces;

ii) eliminating environmental waste generated by the tens of millions of disposable single use gloves used each year, and waste from the usage of foam 'staging' blocks;

iii) superior ergonomics for art handlers, resulting in less chance of injury/RSI;

iv) superior strength and performance when used as a transportation attachment compared to other products on the market;

vv) a design which meets the refined aesthetic requirements specific to the field of visual art: namely, the brackets are thin in profile, ensuring a) that they are inconspicuous once installed and do not distract the viewer from the artwork; b) the artwork may be installed close to flush to the installation wall (artists and curators often wish to minimise the gap between the wall and the artwork); and c) the option to leave the brackets 100 on the artwork and avoid the need to frequently install and remove the brackets 100;

vi) a suitable solution to rest the artworks via the handling tools 200 or engaging portions 210*m*, 210*n*, which avoids having to use blocks that may be dirty and contaminate the artwork;

vii) only nominal training is required to use the system 10, making it suitable for various stakeholders; and viii) separate fasteners (eg, screws etc) are not required to connect the brackets 100 to the handling tools 200.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A handling tool for an artwork handling system, the handling tool including:

an engaging portion that is configured to engage with one or more parts forming an aperture of a bracket that is connected to an artwork, the one or more parts being adapted to transfer weight of the artwork to the engaging portion;

a holding portion connected to the engaging portion, the holding portion assisting in holding the artwork; and a safety mechanism that releasably engages a safety device of the bracket to avoid inadvertent release of the engaging portion from the aperture, wherein:

the engaging portion is configured to be inserted into the aperture from a side of the artwork, the side extending transversely to a front surface displaying an artwork area; and the safety mechanism has a safety release configured to release the safety mechanism from the safety device in response to the safety release being pressed.

2. The handling tool of claim 1, wherein the holding portion is configured to extend transversely away from the engaging portion.

3. The handling tool of claim 1, wherein the holding portion is releasably connected to the engaging portion.

4. The handling tool of claim 1, wherein the holding portion includes a positioning portion that engages with a positioning part of the engaging portion to set its orientation.

5. The handling tool of claim 1, wherein the holding portion includes a positioning lock that assists with locking the holding portion to the engaging portion.

6. The handling tool of claim 1, wherein the engaging portion includes a member defining an engaging axis and the holding portion is located substantially to one side of the engaging axis.

7. The handling tool of claim 1, wherein a position of the holding portion assists in avoiding engagement of a user's hand with a wall when installing the artwork.

8. The handling tool of claim 1, wherein the safety mechanism of the handling tool is configured to move in a direction that is substantially parallel to the front surface to move into a retaining position with the safety device of the bracket.

9. The handling tool of claim 1, wherein the safety mechanism of the handling tool is configured to rotate into a retaining position with the safety device of the bracket.

10. The handling tool of claim 1, wherein the safety mechanism of the handling tool includes two safety mechanisms that are configured to respectively engage the safety device and another safety device of the bracket.

* * * * *